United States Patent
Otani et al.

(10) Patent No.: US 8,520,234 B2
(45) Date of Patent: Aug. 27, 2013

(54) COMMUNICATION SYSTEM, COMMUNICATION APPARATUS, COMMUNICATION METHOD, AND PROGRAM

(75) Inventors: Yomei Otani, Tokyo (JP); Yoshihiro Toyama, Kanagawa (JP); Kenji Yokoyama, Tokyo (JP); Zhongyao Sheng, Tokyo (JP); Hiroshi Oryoji, Kanagawa (JP); Masashige Hagimori, Kanagawa (JP); Ikuya Sano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1178 days.

(21) Appl. No.: 11/525,185

(22) Filed: Sep. 22, 2006

(65) Prior Publication Data

US 2007/0124759 A1 May 31, 2007

(30) Foreign Application Priority Data

Oct. 3, 2005 (JP) .................................. 2005-289624

(51) Int. Cl.
G06F 3/12 (2006.01)
G06F 15/16 (2006.01)
G06F 3/00 (2006.01)
H04W 4/00 (2009.01)
H04N 7/16 (2011.01)
H04N 5/445 (2011.01)
H04N 7/18 (2011.01)

(52) U.S. Cl.
USPC .......... 358/1.15; 709/227; 709/228; 709/229; 455/435.1; 455/41.2; 455/41.3; 725/25; 725/37; 725/74; 725/135

(58) Field of Classification Search
USPC ..... 358/1.15; 709/227, 228, 229; 455/435.1, 455/41.2, 41.3
See application file for complete search history.

(56) References Cited

U.S. PATENT DOCUMENTS

| 5,623,604 | A  | * | 4/1997  | Russell et al. ................ 717/167 |
| 5,647,056 | A  | * | 7/1997  | Barrett et al. ................ 709/220 |
| 2002/0037699 | A1 | * | 3/2002  | Kobayashi et al. ............ 455/41  |
| 2002/0083131 | A1 | * | 6/2002  | Machida ....................... 709/203 |
| 2002/0132584 | A1 | * | 9/2002  | Izumi ............................ 455/41 |
| 2002/0177411 | A1 | * | 11/2002 | Yajima et al. ................... 455/41 |
| 2003/0050998 | A1 | * | 3/2003  | Garnett et al. ................ 709/217 |
| 2004/0128375 | A1 | * | 7/2004  | Rockwell ...................... 709/223 |
| 2004/0266443 | A1 | * | 12/2004 | Ito ................................ 455/445 |
| 2005/0174603 | A1 | * | 8/2005  | Iinuma et al. ................ 358/1.16 |
| 2005/0280862 | A1 | * | 12/2005 | Fukushima ................... 358/1.15 |
| 2008/0301743 | A1 | * | 12/2008 | Vrielink et al. ............... 725/110 |

FOREIGN PATENT DOCUMENTS

| JP | 2001-144767 | 5/2001 |
| JP | 2002-232435 | 8/2002 |
| JP | 2003-134130 | 5/2003 |
| JP | 2004-328093 | 11/2004 |

* cited by examiner

*Primary Examiner* — King Poon
*Assistant Examiner* — Vincent Peren
(74) *Attorney, Agent, or Firm* — Oblon, Spivak, McClelland, Maier & Neustadt, L.L.P.

(57) ABSTRACT

Disclosed herein is a communication system for enabling a first communication apparatus and second communication apparatuses to communicate with one another over a network. The first communication apparatus includes: a detection device; a display control device; a transmission device. The second communication apparatuses includes: a reception device; a notification device; an instruction device; and a registration device.

16 Claims, 18 Drawing Sheets

FIG.11

| COMMAND | ID |
|---|---|
| setLED | AA-BB-CC-11-22-33 |

FIG.13

| COMMAND | ID |
|---------|-----|
| setMAC | AA-BB-CC-11-22-33 | ns
COMMUNICATION SYSTEM, COMMUNICATION APPARATUS, COMMUNICATION METHOD, AND PROGRAM

CROSS REFERENCES TO RELATED APPLICATIONS

The present invention contains subject matter related to Japanese Patent Application JP 2005-289624 filed with the Japanese Patent Office on Oct. 3, 2005, the entire contents of which being incorporated herein by reference.

BACKGROUND OF THE INVENTION

1. Field of the Invention

The present invention relates to a communication system, a communication apparatus, a communication method, and a program. More particularly, the invention relates to a communication system, a communication apparatus, a communication method, and a program for establishing communication settings.

2. Description of the Related Art

Recent years have witnessed widespread acceptance of systems that distribute video and audio data over networks typically under TCP/IP (Transmission Control Protocol/Internet Protocol). These systems generally distribute their data to previously registered apparatuses.

There also exists data communication systems that connect two apparatuses as follows: when a user pushes the connection buttons of the two apparatuses simultaneously, the connection buttons are released simultaneously. At this point, packets containing release timing information are multicast by the system. The timing information is compared with preset information in each apparatus for a match. The matching apparatuses thus identify each other for connection therebetween. One such system is disclosed illustratively in Japanese Patent Laid-open No. 2004-328093.

SUMMARY OF THE INVENTION

One problem with the above type of system is that the user must content with complicated operations when selectively registering a desired apparatus from among a plurality of candidate apparatuses connected to the network.

Illustratively, the data communication system for interconnecting two apparatuses as disclosed in the above-cited patent application typically involves the user carrying out elaborate operations including the pressing-down of the connection buttons of the two apparatuses exactly at the same time. Another problem with the system is that it has difficulty dealing with more than two apparatuses.

A further problem is that when there are a plurality of selectable apparatuses, it is difficult for the user to determine where the desired apparatus to be registered is located.

The present invention has been made in view of the above circumstances and provides arrangements for allowing the user to make communication settings easily and reliably.

In carrying out the present invention and according to one embodiment thereof, there is provided a communication system for enabling a first communication apparatus and second communication apparatuses to communicate with one another over a network. In the system, the first communication apparatus includes: detection means configured to detect the second communication apparatuses connected to the network; display control means configured to control display of a screen showing a list of the detected second communication apparatuses; transmission means configured to transmit a first request to any one of the second communication apparatuses if that second communication apparatus is selected by a user from the list on the display, the first request requesting the second communication apparatus to give notification that the second communication apparatus has been selected. In the system, each of the second communication apparatuses includes: reception means configured to receive the first request sent from the first communication apparatus; and notification means configured to notify the user that the second communication apparatus has been selected in response to the received first request. If the user performs an operation to register the first communication apparatus with the second communication apparatus, then the transmission means sends to the second communication apparatus a second request requesting the second communication apparatus to register the first communication apparatus, and reception means receives the second request sent from the first communication apparatus. Each of the second communication apparatuses further includes: instruction means configured to give an instruction to register the first communication apparatus in response to an operation by the user upon receipt of the second request; and registration means configured to register the first communication apparatus if the instruction to register the first communication apparatus is given in response to the operation by the user.

In the description that follows, the term "network" will refer to a setup that connects at least two apparatuses in a manner enabling one apparatus to send information to the other apparatus. The apparatuses communicating with one another through the network may either be independent of one another or constitute internal blocks that form a single piece of equipment.

In the ensuing description, the term "network" will also refer to an arrangement that functions wirelessly or in wired fashion. The arrangement may alternatively work in a manner in which wired communications performed in one zone are taken over by wireless communications in another zone. The arrangement may further work in such a manner that one apparatus communicates in wired fashion with another apparatus which in turn communicates wirelessly with yet another apparatus, and so on.

In the ensuing description, the communication apparatus will refer either to an independent apparatus or to a block of apparatus carrying out communication processes.

Where the above-outlined communication system of the present invention is in use, a first and a second communication apparatus are arranged to communicate with one another over a network. The first communication apparatus detects the second communication apparatus among others connected to the network; controls display of a screen showing a list of the detected second communication apparatus and others; transmits a first request to any one of the second communication apparatuses if that second communication apparatus is selected by a user from the list on the display, the first request requesting the second communication apparatus to give notification that the second communication apparatus has been selected. The second communication apparatus receives the first request sent from the first communication apparatus, and notifies the user that the second communication apparatus has been selected in response to the received first request. If the user performs an operation to register the first communication apparatus with the second communication apparatus, then the first communication apparatus sends to the second communication apparatus a second request requesting the second communication apparatus to register the first communication apparatus. The second communication apparatus receives the second request sent from the first communication apparatus; gives an instruction to register the first communication apparatus in response to an operation by the user upon receipt of the second request; and registers the first communication apparatus if the instruction to register the first communication apparatus is given in response to the operation by the user.

According to another embodiment of the present invention, there is provided a communication apparatus for carrying out communications over a network. The apparatus includes: detection means configured to detect other communication apparatuses connected to the network; display control means configured to control display of a screen showing a list of the detected other communication apparatuses; and transmission means configured to transmit a first request to any one of the other communication apparatuses if that another communication apparatus is selected by a user from the list on the display, the first request requesting the selected another communication apparatus to give notification that that another communication apparatus has been selected. If the user performs an operation to register the communication apparatus with that another communication apparatus, then the transmission means sends to that another communication apparatus a second request requesting that another communication apparatus to register the communication apparatus.

Preferably, the communication apparatus may further include reception means configured to receive a response sent from that another communication apparatus in response to the first request, the response indicating that the notification given to the user by that another communication apparatus has succeeded. If the user performs the operation to register the communication apparatus with that another communication apparatus, then the transmission means may send to that another communication apparatus the second request requesting that another communication apparatus to register the communication apparatus.

Preferably, the communication apparatus may further include registration means configured to register that another communication apparatus if an instruction to register the communication apparatus is given by that another communication apparatus in response to an operation by the user.

Preferably, the reception means of the communication apparatus may receive a response sent from that another communication apparatus in response to the second request, the response indicating that the registration of the communication apparatus with that another communication apparatus has been completed. The registration means may register that another communication apparatus on the basis of the received response.

Preferably, upon receipt of the response, the display control means may control the display of a screen on which the user performs the operation to register that another communication apparatus.

Preferably, the first request may be a request requesting that another communication apparatus to blink a light emitting diode arrangement.

Preferably, each of the first and the second requests may include information regarding a media access control address of the communication apparatus.

According to a further embodiment of the present invention, there is provided a communication method for use with a communication apparatus for carrying out communications over a network. The communication method includes the steps of: detecting other communication apparatuses connected to the network; controlling display of a screen showing a list of the detected other communication apparatuses; and controlling transmission of a first request to any one of the other communication apparatuses if that another communication apparatus is selected by a user from the list on the display, the first request requesting the selected another communication apparatus to give notification that that another communication apparatus has been selected. If the user performs an operation to register the communication apparatus with that another communication apparatus, then the transmission controlling step controls transmission to that another communication apparatus of a second request requesting that another communication apparatus to register the communication apparatus.

According to an even further embodiment of the present invention, there is provided a program for causing a computer to execute a procedure enabling a communication apparatus to carry out communications over a network. The procedure includes the steps of: detecting other communication apparatuses connected to the network; controlling display of a screen showing a list of the detected other communication apparatuses; and controlling transmission of a first request to any one of the other communication apparatuses if that another communication apparatus is selected by a user from the list on the display, the first request requesting the selected another communication apparatus to give notification that that another communication apparatus has been selected. If the user performs an operation to register the communication apparatus with that another communication apparatus, then the transmission controlling step controls transmission to that another communication apparatus of a second request requesting that another communication apparatus to register the communication apparatus.

Where the above-outlined communication method or program of the present invention is in use, another communication apparatus among others connected to the network is first detected. The display of a screen is then controlled so that it shows a list of the detected another communication apparatus and others. A first request is transmitted to that another communication apparatus if that another communication apparatus is selected by a user from the list on the display, the first request requesting that another communication apparatus to give notification that that another communication apparatus has been selected. If the user performs an operation to register the communication apparatus with that another communication apparatus, then a second request is transmitted to that another communication apparatus, the second request requesting that another communication apparatus to register the communication apparatus.

According to a still further embodiment of the present invention, there is provided a communication apparatus for carrying out communications over a network. The communication apparatus includes: reception means configured to receive a first request sent from another communication apparatus connected to the network, the first request requesting that a user of the communication apparatus be notified that the communication apparatus has been selected by that another communication apparatus; and notification means configured to notify the user that the communication apparatus has been selected in response to the received first request. The reception means receives a second request sent from that another communication apparatus, the second request requesting registration of that another communication apparatus. The communication apparatus further includes: instruction means configured to give an instruction to register that another communication apparatus in response to an operation by the user upon receipt of the second request; and registration means configured to register that another communication apparatus if the instruction to register that another communication apparatus is given in response to the operation by the user.

Preferably, the communication apparatus may further include transmission means configured to transmit a response to that another communication apparatus when the user is notified that the communication apparatus has been selected in response to the first request, the response indicating that the notification given to the user has succeeded. The reception means may receive the second request sent from that another communication apparatus in response to the response.

Preferably, the notification means may be constituted by a light emitting diode arrangement.

Preferably, the communication apparatus may further include notification control means configured to control the light emitting diode arrangement in such a manner that a blinking speed of the light emitting diode arrangement in effect when the first request is received from that another communication apparatus is different from the blinking speed in effect when the instruction to register that another communication apparatus is given in response to the operation by the user.

Preferably, if the registration of that another communication apparatus has succeeded, then the transmission means may transmit a response to that another communication apparatus, the response indicating that the registration of that another communication apparatus has been completed.

Preferably, each of the first and the second requests may include information regarding a media access control address of that another communication apparatus.

Preferably, upon receipt of the second request, the registration means may compare the information regarding the media access control address included in the first request with the information regarding the media access control address included in the second request, and may register that another communication apparatus if there is a match between the two kinds of information compared.

According to a yet further embodiment of the present invention, there is provided a communication method for use with a communication apparatus for carrying out communications over a network. The communication method includes the steps of: controlling reception of a first request sent from another communication apparatus connected to the network, the first request requesting that a user of the communication apparatus be notified that the communication apparatus has been selected by that another communication apparatus; and notifying the user that the communication apparatus has been selected in response to the received first request. In the method, the reception controlling step controls reception of a second request sent from that another communication apparatus, the second request requesting registration of that another communication apparatus. The communication method further includes the steps of: giving an instruction to register that another communication apparatus in response to an operation by the user upon receipt of the second request; and registering that another communication apparatus if the instruction to register that another communication apparatus is given in response to the operation by the user.

According to another embodiment of the present invention, there is provided a program for causing a computer to execute a procedure enabling a communication apparatus to carry out communications over a network. The procedure includes the steps of: controlling reception of a first request sent from another communication apparatus connected to the network, the first request requesting that a user of the communication apparatus be notified that the communication apparatus has been selected by that another communication apparatus; and notifying the user that the communication apparatus has been selected in response to the received first request. The reception controlling step controls reception of a second request sent from that another communication apparatus, the second request requesting registration of that another communication apparatus. The procedure further includes the steps of: giving an instruction to register that another communication apparatus in response to an operation by the user upon receipt of the second request; and registering that another communication apparatus if the instruction to register that another communication apparatus is given in response to the operation by the user.

Where the aforementioned communication method or program of the present invention is in use, a first request sent from another communication apparatus connected to the network is received, the first request requesting that a user of the communication apparatus be notified that the communication apparatus has been selected by that another communication apparatus. The user is then notified that the communication apparatus has been selected in response to the received first request. A second request sent from that another communication apparatus is received, the second request requesting registration of that another communication apparatus. An instruction to register that another communication apparatus is given in response to an operation by the user upon receipt of the second request. That another communication apparatus is registered if the instruction to register that another communication apparatus is given in response to the operation by the user.

According to the embodiments of the present invention, as outlined above, the user can make communication settings easily and reliably.

BRIEF DESCRIPTION OF THE DRAWINGS

FIG. 11 a tabular view listing a typical blink command;

FIG. 13 is a tabular view listing a typical registration command;

DETAILED DESCRIPTION OF THE PREFERRED EMBODIMENTS

The following is a detailed description of the embodiments according to the present invention. This description is intended to ensure that the embodiments according to the present invention conform to the specification and drawings therein. The embodiments may include those which have the constituents of the present invention which are not shown in the specification or the drawings therein. This does not necessarily mean that such embodiments do not correspond to the constituents of the present invention. Conversely, even though some embodiments may be written as conforming to the constituents of the present invention, it does not necessarily mean that such embodiments do not conform to other constituents than the constituents.

Figure 1:
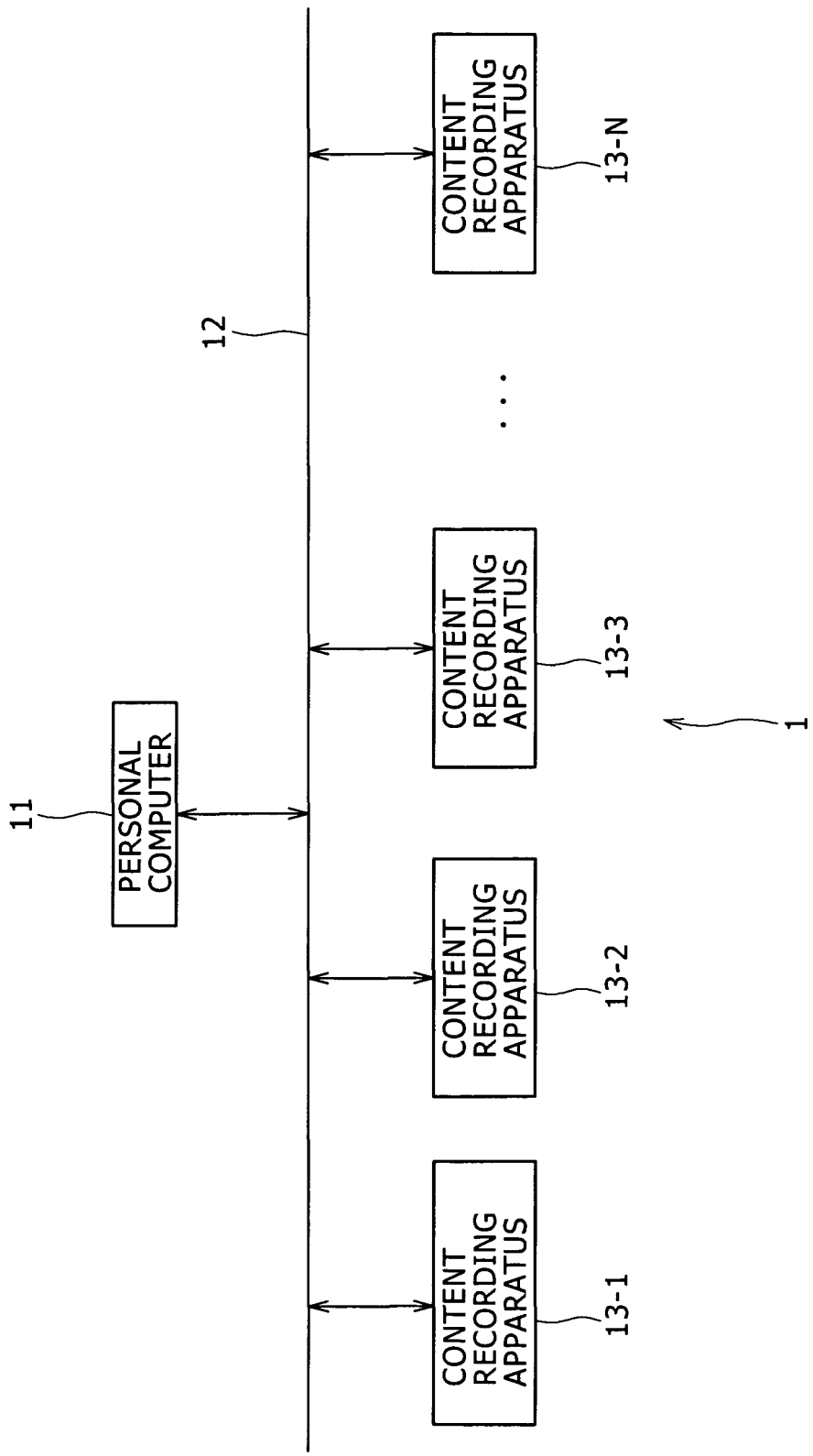
FIG. 1 is a block diagram showing a typical configuration of a content delivery system according to the present invention.

One preferred embodiment of the present invention as outlined above is a communication system (e.g., content delivery system 1 in FIG. 1) for enabling a first communication apparatus (e.g., personal computer 11 in FIG. 1) and second communication apparatuses (e.g., content recording apparatuses 13-1 through 13-N in FIG. 1) to communicate with one another over a network (e.g., network 12 in FIG. 1). In the system, the first communication apparatus includes: detection means (e.g., apparatus detection device 61 in FIG. 3); display control means (e.g., display control device 62 in FIG. 3); and transmission means (e.g., communication device 29 in FIG. 3). The detection means is configured to detect the second communication apparatuses connected to the network. The display control means is configured to control display of a screen showing a list of the detected second communication apparatuses. The transmission means is configured to transmit a first request (e.g., blink command in FIG. 11) to any one of the second communication apparatuses if that second communication apparatus is selected by a user from the list on the display, the first request requesting the second communication apparatus to give notification that the second communication apparatus has been selected. In the system, each of the second communication apparatuses (e.g., content recording apparatuses 13-1 through 13-N in FIG. 1) includes: reception means (e.g., communication device 108 in FIG. 6); and notification means (e.g., LED arrangement 91 in FIG. 6). The reception means is configured to receive the first request (e.g., blink command in FIG. 11) sent from the first communication apparatus (e.g., personal computer 11 in FIG. 1). The notification means is configured to notify the user that the second communication apparatus has been selected in response to the received first request. If the user performs an operation to register the first communication apparatus with the second communication apparatus, then the transmission means sends to the second communication apparatus a second request (e.g., registration command in FIG. 13) requesting the second communication apparatus to register the first communication apparatus. In response to that, the reception means receives the second request sent from the first communication apparatus. Each of the second communication apparatuses further includes: instruction means (e.g., entry button 92 in FIG. 6) configured to give an instruction to register the first communication apparatus in response to an operation by the user upon receipt of the second request; and registration means (e.g., apparatus registration device 162 in FIG. 6) configured to register the first communication apparatus if the instruction to register the first communication apparatus is given in response to the operation by the user.

Another preferred embodiment of the present invention as outlined above is a communication apparatus (e.g., personal computer 11 in FIG. 1) for carrying out communications over a network (e.g., network 12 in FIG. 1). The apparatus includes: detection means (e.g., apparatus detection device 61 in FIG. 3); display control means (e.g., display control device 62 in FIG. 3); and transmission means (e.g., communication device 29 in FIG. 3). The detection means is configured to detect other communication apparatuses (e.g., content recording apparatuses 13-1 through 13-N in FIG. 1) connected to the network. The display control means is configured to control display of a screen (e.g., video server setting screen 201 in FIG. 9) showing a list of the detected other communication apparatuses. The transmission means is configured to transmit a first request (e.g., blink command in FIG. 11) to any one of the other communication apparatuses if that another communication apparatus is selected by a user from the list on the display, the first request requesting the selected another communication apparatus to give notification that that another communication apparatus has been selected. If the user performs an operation to register the communication apparatus with that another communication apparatus, then the transmission means sends to that another communication apparatus a second request (e.g., registration command in FIG. 13) requesting that another communication apparatus to register the communication apparatus.

Preferably, the communication apparatus may further include reception means (e.g., communication device 29 in FIG. 3) configured to receive a response (e.g., B-ACK) sent from that another communication apparatus in response to the first request, the response indicating that the notification given to the user by that another communication apparatus has succeeded. If the user performs the operation to register the communication apparatus with that another communication apparatus, then the transmission means may send to that another communication apparatus the second request requesting that another communication apparatus to register the communication apparatus.

Preferably, the communication apparatus may further include registration means (e.g., apparatus registration device 63 in FIG. 3) configured to register that another communication apparatus if an instruction to register the communication apparatus is given by that another communication apparatus in response to an operation by the user.

Preferably, the reception means of the communication apparatus may receive a response (e.g., B-ACK) sent from that another communication apparatus in response to the second request, the response indicating that the registration of the communication apparatus with that another communication apparatus has been completed. The registration means may register that another communication apparatus on the basis of the received response.

Preferably, upon receipt of the response, the display control means may control the display of a screen on which the user performs the operation to register that another communication apparatus.

Preferably, the first request may be a request requesting that another communication apparatus to blink a light emitting diode arrangement.

Preferably, each of the first and the second requests may include information regarding a media access control address of the communication apparatus.

Figure 8:
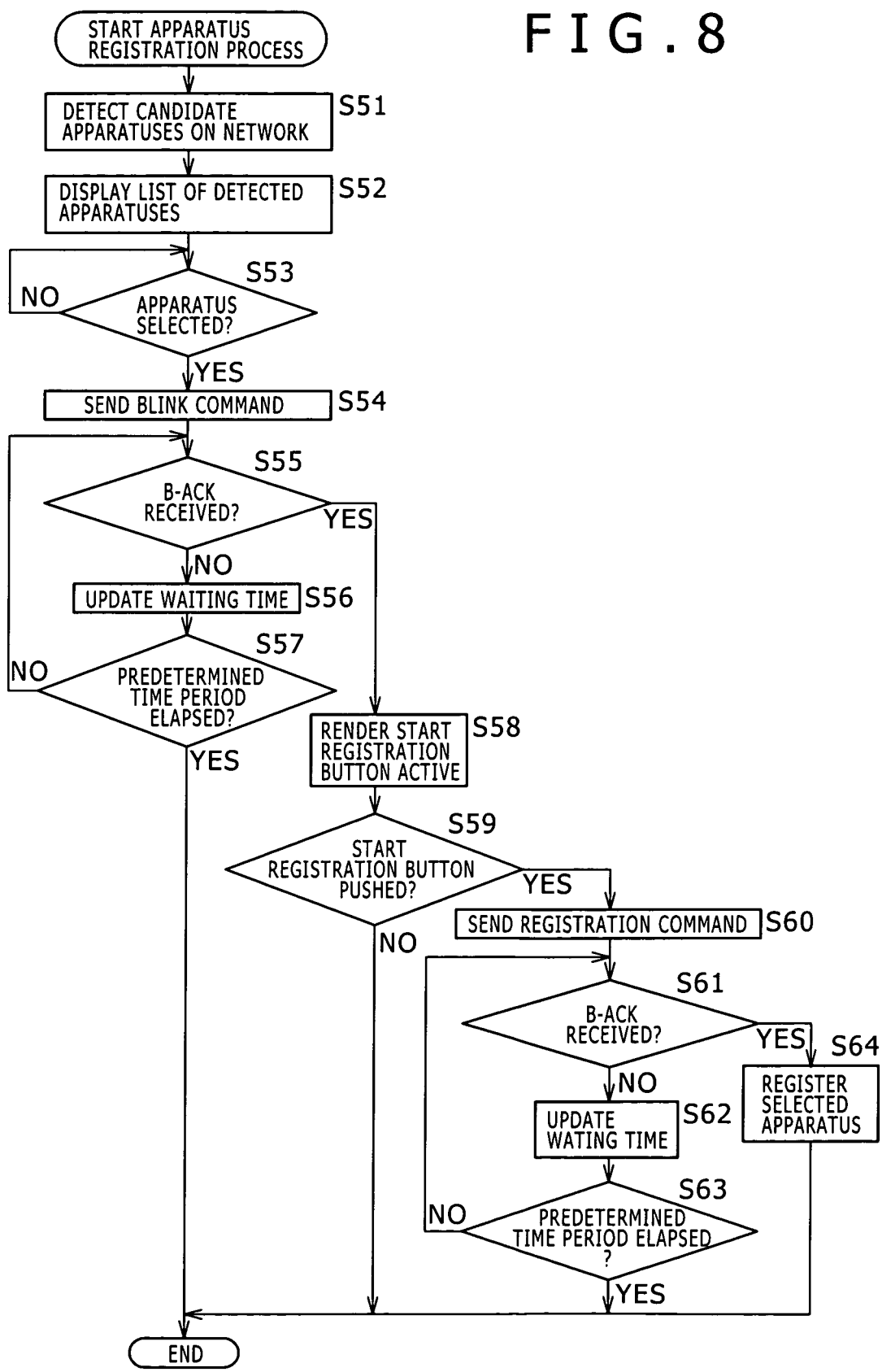
FIG. 8 is a flowchart of steps constituting an apparatus registration process performed by the personal computer.

An even further preferred embodiment of the present invention is a communication method or a program including: a detecting step (e.g., in step S51 of FIG. 8); a display controlling step (e.g., in step S52 of FIG. 8); and a transmission controlling step (e.g., in step S54 of FIG. 8). The detecting step detects other communication apparatuses connected to a network. The display controlling step controls display of a screen showing a list of the detected other communication apparatuses. The transmission controlling step controls transmission of a first request (e.g., blink command in FIG. 11) to any one of the other communication apparatuses if that another communication apparatus is selected by a user from the list on the display, the first request requesting the selected another communication apparatus to give notification that that another communication apparatus has been selected. If the user performs an operation to register the communication apparatus with that another communication apparatus, then the transmission controlling step controls transmission to that another communication apparatus of a second request requesting that another communication apparatus to register the communication apparatus.

An even further preferred embodiment of the present invention as outlined above is a communication apparatus (e.g., each of content recording apparatuses 31-1 through 13-N in FIG. 1) for carrying out communications over a network (e.g., network 12 in FIG. 1). The apparatus includes reception means (e.g., communication device 108 in FIG. 6) and notification means (e.g., LED arrangement 91 in FIG. 6). The reception means is configured to receive a first request (e.g., blink command in FIG. 11) sent from another communication apparatus (e.g., personal computer 11 in FIG. 1) connected to the network, the first request requesting that a user of the communication apparatus be notified that the communication apparatus has been selected by that another communication apparatus. The notification means is configured to notify the user that the communication apparatus has been selected in response to the received first request. The reception means receives a second request (e.g., registration command in FIG. 13) sent from that another communication apparatus, the second request requesting registration of that another communication apparatus. The communication apparatus further includes: instruction means (e.g., entry button 92 in FIG. 6) configured to give an instruction to register that another communication apparatus in response to an operation by the user upon receipt of the second request; and registration means (e.g., apparatus registration device 162 in FIG. 6) configured to register that another communication apparatus if the instruction to register that another communication apparatus is given in response to the operation by the user.

Preferably, the communication apparatus may further include transmission means (e.g., communication device 108 in FIG. 6) configured to transmit a response to that another communication apparatus when the user is notified that the communication apparatus has been selected in response to the first request, the response indicating that the notification given to the user has succeeded; wherein the reception means may receive the second request sent from that another communication apparatus in response to the response.

Preferably, the notification means may be constituted by a light emitting diode arrangement.

Preferably, the communication apparatus may further include notification control means (e.g., LED control device 161 in FIG. 6) configured to control the light emitting diode arrangement in such a manner that a blinking speed of the light emitting diode arrangement in effect when the first request is received from that another communication apparatus is different from the blinking speed in effect when the instruction to register that another communication apparatus is given in response to the operation by the user.

Preferably, if the registration of that another communication apparatus has succeeded, then the transmission means may transmit a response (e.g., B-ACK) to that another communication apparatus, the response indicating that the registration of that another communication apparatus has been completed.

Preferably, each of the first and the second requests may include information regarding a media access control address of that another communication apparatus.

Preferably, upon receipt of the second request, the registration means may compare the information regarding the media access control address included in the first request (e.g., "AA-BB-CC-11-22-33" in FIG. 11) with the information regarding the media access control address included in the second request (e.g., "AA-BB-CC-11-22-33" in FIG. 13), and may register that another communication apparatus if there is a match between the two kinds of information compared.

Figure 18:
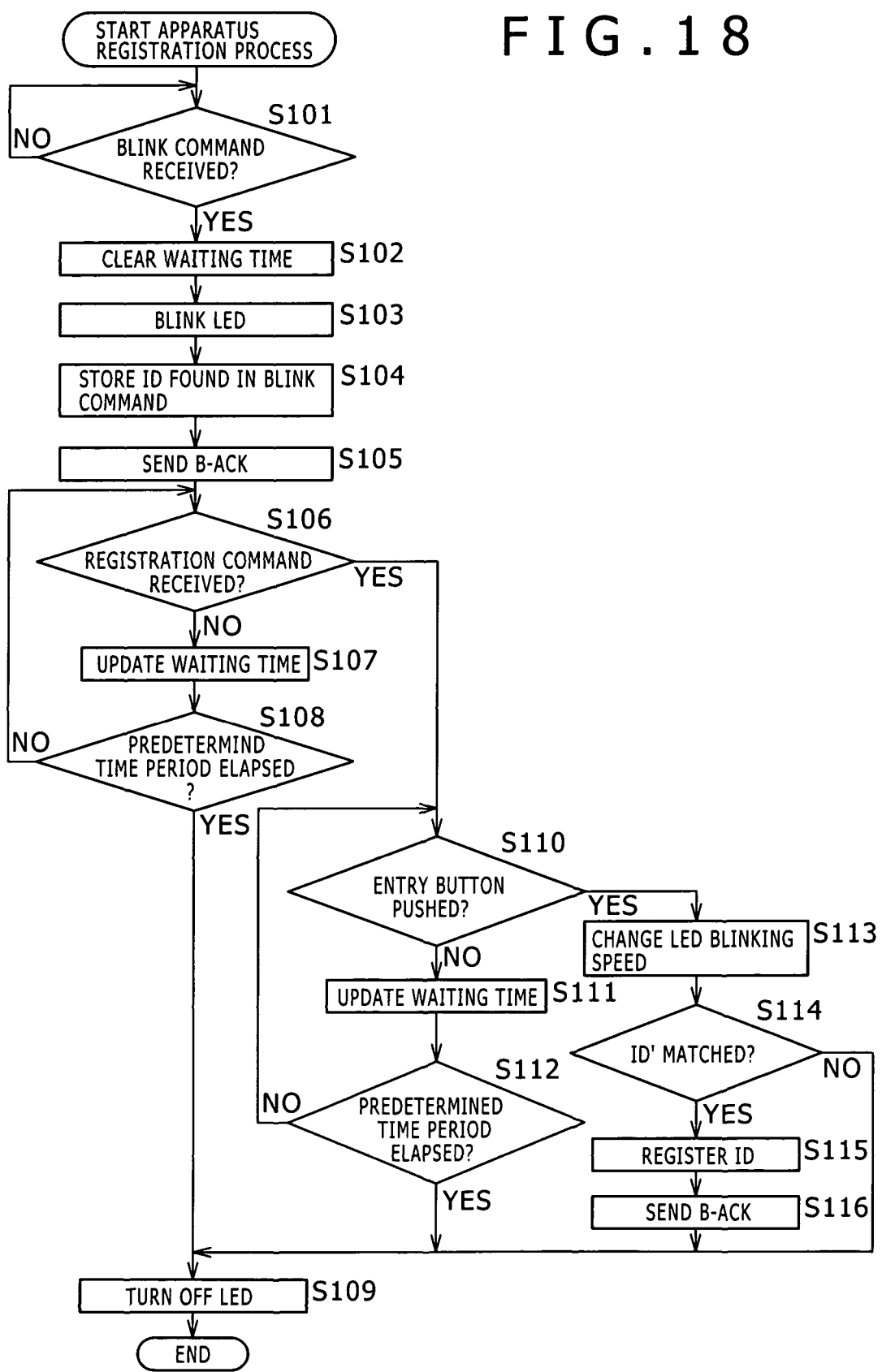
FIG. 18 is a flowchart of steps constituting an apparatus registration process performed by the content recording apparatus.

A still further preferred embodiment of the present invention as outlined above is a communication method or a program including a reception controlling step (e.g., in step S101 of FIG. 18) and a notifying step (e.g., in step S103 of FIG. 18). The reception controlling step controls reception of a first request (e.g., blink command in FIG. 11) sent from another communication apparatus connected to the network, the first request requesting that a user of the communication apparatus be notified that the communication apparatus has been selected by that another communication apparatus. The notifying step notifies the user that the communication apparatus has been selected in response to the received first request. The reception controlling step further controls reception of a second request (e.g., registration command in FIG. 13) sent from that another communication apparatus, the second request requesting registration of that another communication apparatus. The communication method or program further includes the steps of: giving (e.g., in step S110 of FIG. 18) an instruction to register that another communication apparatus in response to an operation by the user upon receipt of the second request; and registering (e.g., in step S115 of FIG. 18) that another communication apparatus if the instruction to register that another communication apparatus is given in response to the operation by the user.

Figure 2:
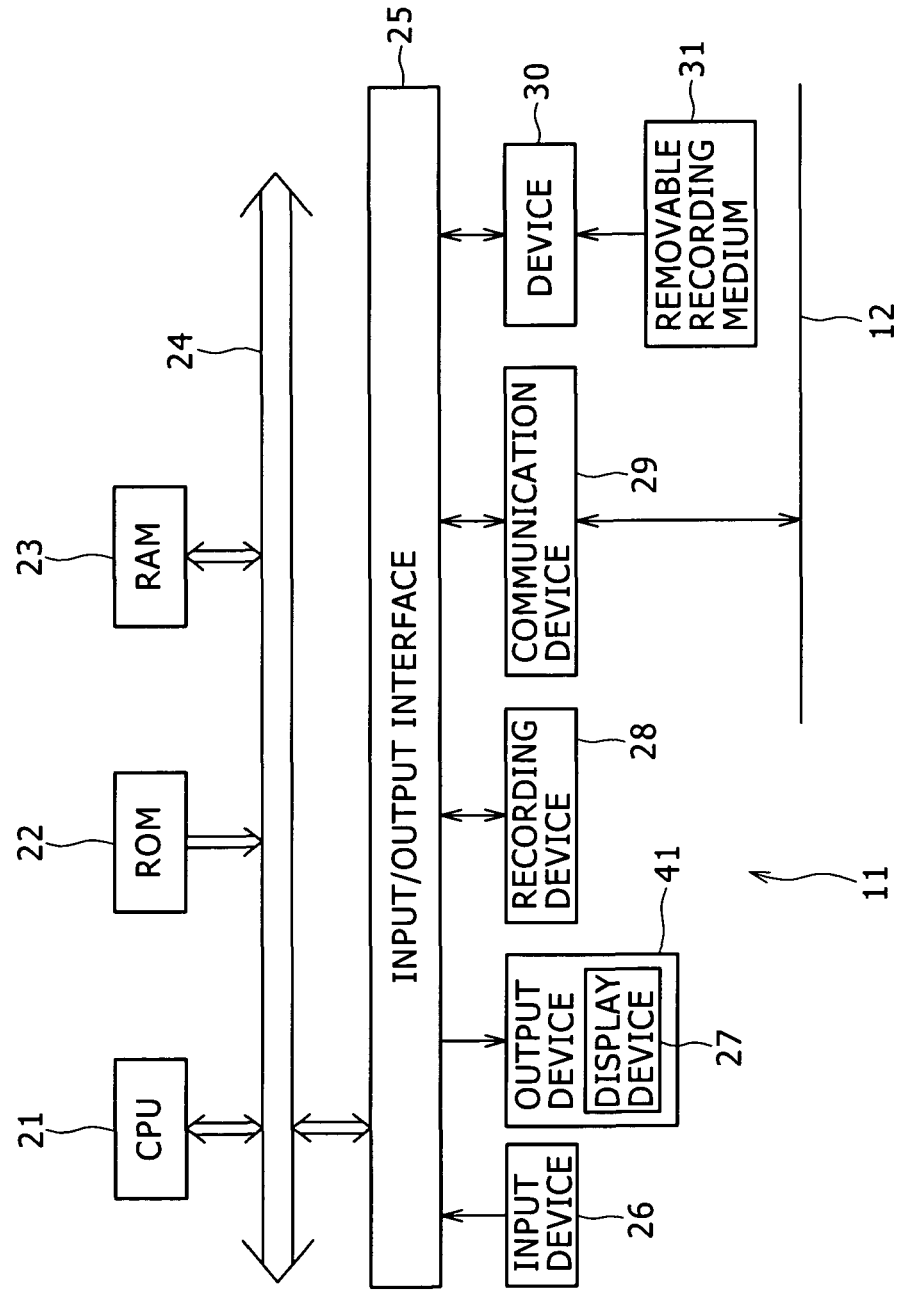
FIG. 2 is a block diagram showing a typical hardware structure of a personal computer.

The inventive programs outlined above may be recorded on a suitable recording medium (e.g., removable recording medium 31 in FIG. 2).

The preferred embodiments of the present invention will now be described in more detail with reference to the accompanying drawings.

FIG. 1 is a block diagram showing a typical configuration of a content delivery system 1 according to the present invention. The content delivery system 1 is made up of a personal computer 11 and content recording apparatuses 13-1 through 13-N each connected to a network 12. As such, the content delivery system 1 is a typical example of the communication system according to the present invention.

In response to a user's operations, the personal computer 11 selects one of the content recording apparatuses 13-1 through 13-N connected to the network 12 and sets the selected apparatus for the reception of delivered contents. The personal computer 11 receives contents from the selected content recording apparatus over the network 12, causes a display device 41 (to be discussed later) to display images based on the received contents, and outputs the accompanying sound through speakers (not shown) for the user's enjoyment. The personal computer 11 is a typical example of the communication apparatus according to the present invention.

The network 12 may be constituted by a wired LAN (local area network) based on the Ethernet (registered trademark) standard, by a wireless LAN conforming to the IEEE (The Institute of Electrical and Electronic Engineers, Inc.) 802.11 standard, or by the Internet.

The content recording apparatus 13-1 is typically a hard disk recorder, a DVD (digital versatile disk) recorder, a video tape recorder, or a hybrid video recorder combining a hard disk recorder with a DVD recorder connectable to the network 12. Illustratively, the content recording apparatus 13-1 may receive and record TV programs being broadcast by broadcasting stations. The content recording apparatus 13-1 delivers recorded contents to the personal computer 11 over the network 12 in response to requests from the personal computer 11 that has been registered with the content recording apparatus 13-1 in question.

The content recording apparatus 13-2 is typically a hard disk recorder which, as with the content recording apparatus 13-1, receives and records contents being broadcast by broadcasting stations. The content recording apparatus 13-1 subsequently delivers recorded contents to the personal computer 11 over the network 12 in response to requests from the personal computer 11 that has been registered with the content recording apparatus 13-2 in question.

Likewise, the content recording apparatuses 13-3 through 13-N are typically hard disk recorders which, as with the content recording apparatus 13-1, receive and record contents being broadcast by broadcasting stations. The content recording apparatuses 13-3 through 13-N later deliver recorded contents to the personal computer 11 over the network 12 in response to requests from the personal computer 11 that has been registered with each of the content recording apparatuses 13-3 through 13-N.

Each of the content recording apparatuses 13-1 through 13-N is a typical example of the communication apparatus according to the present invention. Where there is no particular need to distinguish the content recording apparatuses 13-1 through 13-N from one another, they will be referred to generically as the content recording apparatus 13.

FIG. 2 is a block diagram showing a typical hardware structure of the personal computer 11. In the personal computer 11 of FIG. 2, a CPU (central processing unit) 21 carries out diverse processes in keeping with the programs stored in a ROM (read only memory) 22 or with the programs loaded from a recording device 28 into a RAM (random access memory) 23. The RAM 23 further retains data that may be needed by the CPU 21 in carrying out its processing.

The CPU 21, ROM 22, and RAM 23 are interconnected via a bus 24. An input/output interface 25 is also connected to the bus 24.

The input/output interface 25 is connected with an input device 26, an output device 27, the recording device 28, and a communication device 29. The input device 26 may include a keyboard, a mouse, and a remote controller (including a photoreceptor). The output device 27 may be formed by speakers and a display. The recording device 28 may be composed of a hard disk drive. The communication device 29 may control communications with other blocks (e.g., content recording apparatuses 13-1 through 13-N in the example of FIG. 1) via the network 12. The output device 27 is typically structured to include the display device 41 such as an LCD (liquid crystal display).

A drive 30 is connected as needed to the input/output interface 25. A removable recording medium 31 such as a magnetic disk, an optical disk, a magneto-optical disk, or a semiconductor memory may be loaded into the drive 30. Computer programs retrieved from the loaded recording medium through the drive 30 are installed as needed onto the recording device 28.

The hardware structure of the personal computer 11 is not limited to what is shown in FIG. 2. The personal computer 11 need only have a functional structure such as one depicted in FIG. 3 (to be discussed later).

Figure 3:
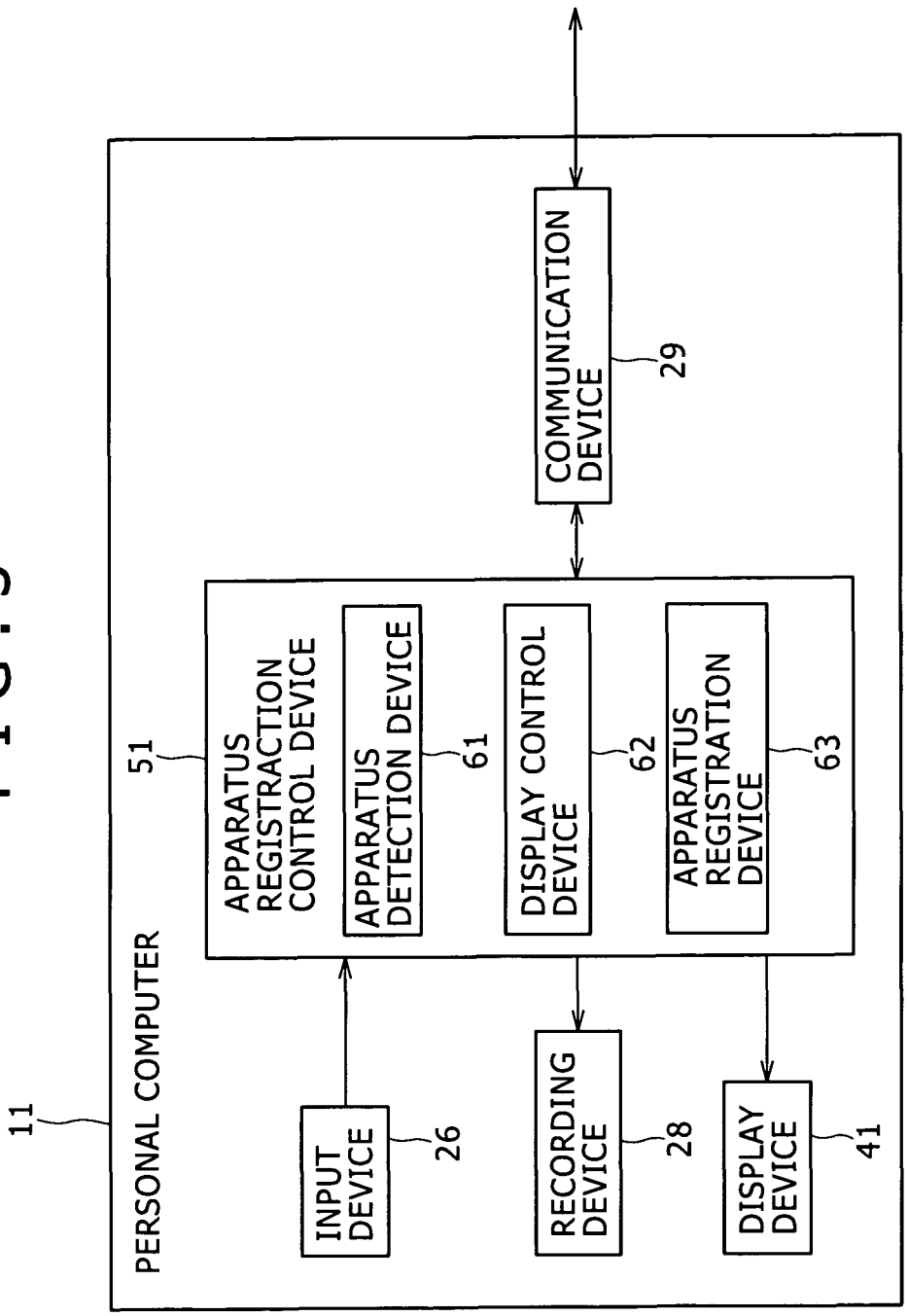
FIG. 3 is a block diagram showing a typical functional structure of the personal computer.

FIG. 3 is a block diagram showing a typical functional structure of the personal computer 11. The personal computer 11 is structured to include the input device 26, recording device 28, communication device 29, display device 41, and an apparatus registration control device 51.

Because the personal computer 11 of this embodiment has the above-described hardware structure of FIG. 2, the apparatus registration control device 51 is furnished illustratively as application software to be carried out by the CPU 21 in FIG. 2. If the personal computer 11 is designed to have a structure different from the hardware structure in FIG. 2, the apparatus registration control device 51 may be configured as a hardware unit or as a hybrid entity combining software with hardware elements.

The apparatus registration control device 51 carries out processes whereby any one of the apparatuses connected to the network 12 (e.g., content recording apparatuses 13-1 through 13-N) is set to receive delivered contents.

More specifically, the apparatus registration control device 51 performs steps to register the personal computer 11 with the content recording apparatus 13 as an apparatus authorized to receive delivered contents from the latter. At the same time, the apparatus registration control device 51 carries out steps to register the content recording apparatus 13 with the personal computer 11 as an apparatus authorized to deliver contents to the latter.

The apparatus registration control device 51 is structured to include an apparatus detection device 61, a display control device 62, and an apparatus registration device 63.

The apparatus detection device 61 causes the communication device 29 to send packets to broadcast addresses (or multicast addresses) under a predetermined protocol so as to detect candidate apparatuses on the network 12. The apparatus detection device 61 forwards the result of the apparatus detection coming from the communication device 29 to the display control device 62. How the apparatus detection device 61 detects the candidate apparatuses on the network 12 will be discussed later in more detail by referring to FIGS. 16 through 17D.

The display control device 62 controls the display of images (e.g., video server setting screen 201, to be discussed later, on which to make settings of the content recording apparatus 13) appearing on the screen of the display device 41.

Illustratively, on the basis of the result of the apparatus detection coming from the apparatus detection device 61, the display control device 62 controls the display of the video server setting screen 201 so that a list of the detected apparatuses will appear on the screen, as will be described later. Given notification (e.g., B-ACK (acknowledgement)) from the content recording apparatus 13, the display control device 62 controls the display of the video server setting screen 201 accordingly, as will be discussed later.

The apparatus registration device 63 performs steps to register the user-selected apparatus (e.g., content recording apparatus 13) as an authorized apparatus from which to receive delivered contents.

Illustratively, when the user-selected apparatus has successfully authenticated and registered the personal computer 11, the apparatus registration device 63 accomplishes the registration by storing information about the user-selected apparatus into a table (called delivery source management table) which is retained in the recording device 28 and which manages the apparatuses from which to receive content delivery.

Figure 4:
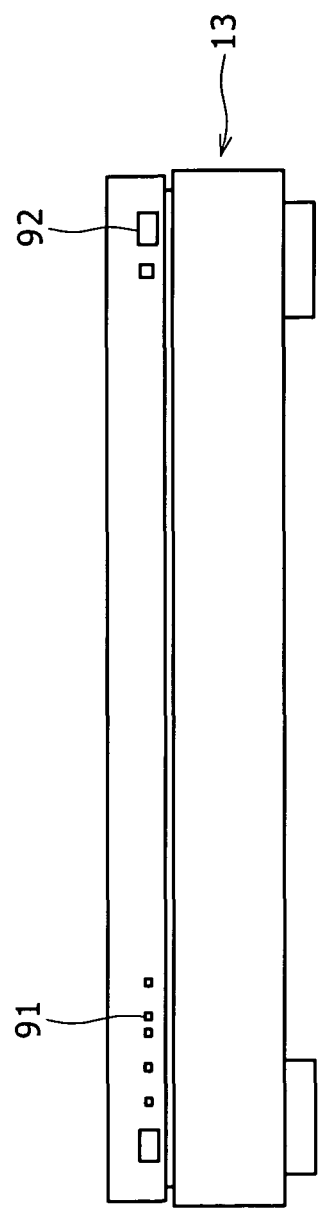
FIG. 4 is an external view explanatory of a content recording apparatus.

FIG. 4 is an external view explanatory of the content recording apparatus 13. This view is in fact a front view of the content recording apparatus 13.

As described above, the content recording apparatus 13 is typically a hard disk recorder that receives and records contents being broadcast by broadcasting stations. The content recording apparatus 13 has an LED (light emitting diode) arrangement 91 and an entry button 92 in addition to the other controls including the power button.

The LED arrangement 91 blinks when the content recording apparatus 13 in FIG. 4 is selected by the user operating the personal computer 11 as an apparatus from which to receive delivered contents.

The LED arrangement 91 changes its blinking speed in keeping with the process being carried out by the content recording apparatus 13, as will be discussed later in detail. The user verifies what the content recording apparatus 13 is currently doing (i.e., status of apparatus registration) by visually checking the speed at which the LED arrangement 91 is blinking.

The LED arrangement 91 may be replaced illustratively by an audio output unit audibly allowing the user to recognize that the apparatus has been selected. Any other suitable setup may be adopted as long as it can notify the user that the apparatus has been selected.

The entry button 92 is pushed by the user when the personal computer 11 is to be registered with the content recording apparatus 13 whose LED arrangement 91 is blinking. With its entry button 92 pushed by the user, the LED-blinking content recording apparatus 13 registers the personal computer 11.

The entry button 92, when pushed, also causes the personal computer 11 to register the LED-blinking content recording apparatus 13. That is, the content recording apparatus 13 with its LED arrangement 91 blinking is registered with the personal computer 11 when the user pushes the entry button 92.

In the example of FIG. 4, the LED arrangement 91 is shown located on the left and the entry button 92 on the right of the apparatus enclosure. However, this layout is not limitative of the present invention. Any other layout of controls and indicators may be adopted for easy recognition and operation by the user.

Figure 5:
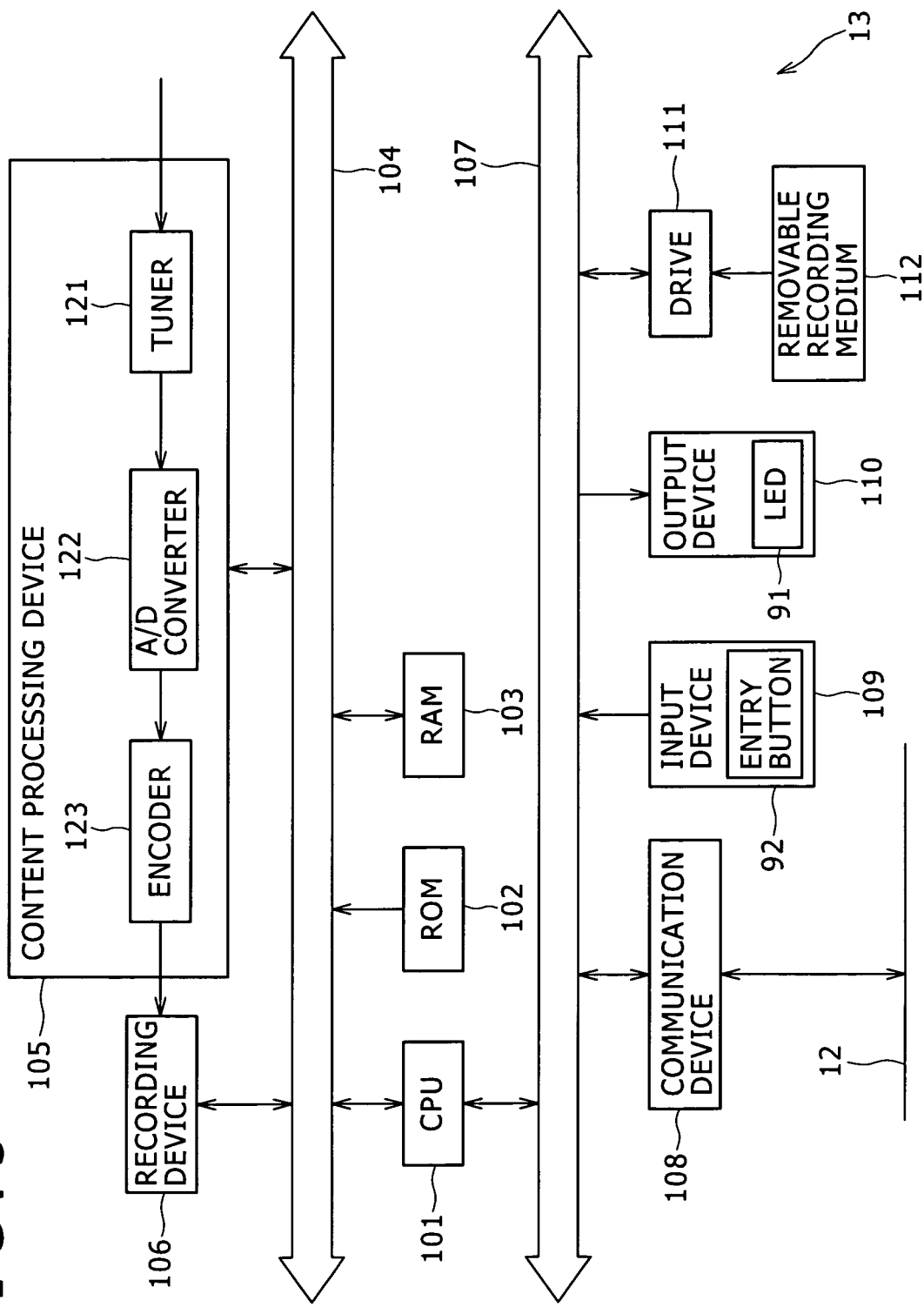
FIG. 5 is a block diagram showing a typical hardware structure of the content recording apparatus.

FIG. 5 is a block diagram showing a typical hardware structure of the content recording apparatus 13. In the content recording apparatus 13 of FIG. 5, a CPU 101 carries out diverse processes in accordance with the programs held in a ROM 102. Programs sent over the network 12 may be received by the CPU 101 through a communication device 108 and a bus 107 and loaded into a RAM 103. The CPU 103 may perform various process in keeping with the programs thus loaded. The RAM 103 may further accommodate data that may be needed by the CPU 101 in carrying out its processing.

The CPU 101, ROM 102, and RAM 103 are interconnected via a bus 104. A content processing device 105 and a recording device 106 are also connected to the bus 104.

The content processing device 105 is designed to receive (i.e., acquire) TV programs (i.e., contents) being broadcast by broadcasting stations. Illustratively, the content processing device 105 is arranged to receive a plurality of contents being simultaneously broadcast by a plurality of broadcasting stations in the same time slot.

The content processing apparatus 105 is typically structured to include a tuner 121, an A/D (analog to digital) converter 122, and an encoder 123.

The tuner 121 demodulates airwaves of terrestrial or satellite TV broadcasts received by an antenna, not shown. The video and audio signals derived from the received airwaves are forwarded from the tuner 121 to the A/D converter 122.

More specifically, the airwaves of the channel designated by the CPU 101, i.e., the airwaves constituting the TV program being broadcast by the broadcasting station to which the channel is assigned, are received by the antenna. The received airwaves are demodulated by the tuner 121 and the resulting video and audio signals in analog form are sent to the A/D converter 122.

The A/D converter 122 subjects the analog video and audio signals coming from the tuner 121 to an analog-to-digital conversion process, and supplies the encoder 123 with digital video and audio signals derived from the conversion process. In the description that follows, the digital signals coming from the A/D converter 122, i.e., digital video and audio signals constituting the broadcast program of interest, will be generically referred to as content data.

The encoder 123 encodes (i.e., compression-encodes) the content data coming from the A/D converter 122 illustratively in accordance with the MPEG (Moving Picture Experts Group) standard, and sends the encoded data to the recording device 106. In the ensuing description, the encoded content data output by the encoder 123 will be referred to as compressed content data.

The recording device 106 is typically composed of a hard disk drive that records in a predetermined file format the compressed content data supplied from the content processing device 105. That is, the recording device 106 stores files including the compressed content data. Program information (called meta data) about the recorded broadcast programs is also recorded to the recording device 106.

The CPU 101 is connected to the bus 107 which in turn is connected with the communication device 108, an input device 109, and an output device 110. The communication device 108 exchanges data with another apparatus (e.g., personal computer 11) over the network 12.

As described in connection with the example of FIG. 4, the input device 109 is structured to include the entry button 92. The output device 110 is arranged to include the LED arrangement 91.

A drive 111 is connected as needed to the bus 107. A removable recording medium 112 such as a magnetic disk, an optical disk, a magneto-optical disk, or a semiconductor memory may be loaded into the drive 111. Computer programs retrieved from the loaded recording medium through the drive 111 are installed as needed onto the recording device 106.

The hardware structure of the content recording apparatus 13 is not limited to what is shown in FIG. 5. The content recording apparatus 13 need only have a functional structure such as one depicted in FIG. 6 (to be discussed later).

In the foregoing description, the content processing device 105 was shown to contain one tuner 121, one A/D converter 122 and one encoder 123. Alternatively, the content processing device 105 may include a plurality of units of the tuner 121, A/D converter 122, and encoder 123 each so that a plurality of channels may be recorded simultaneously.

Figure 6:
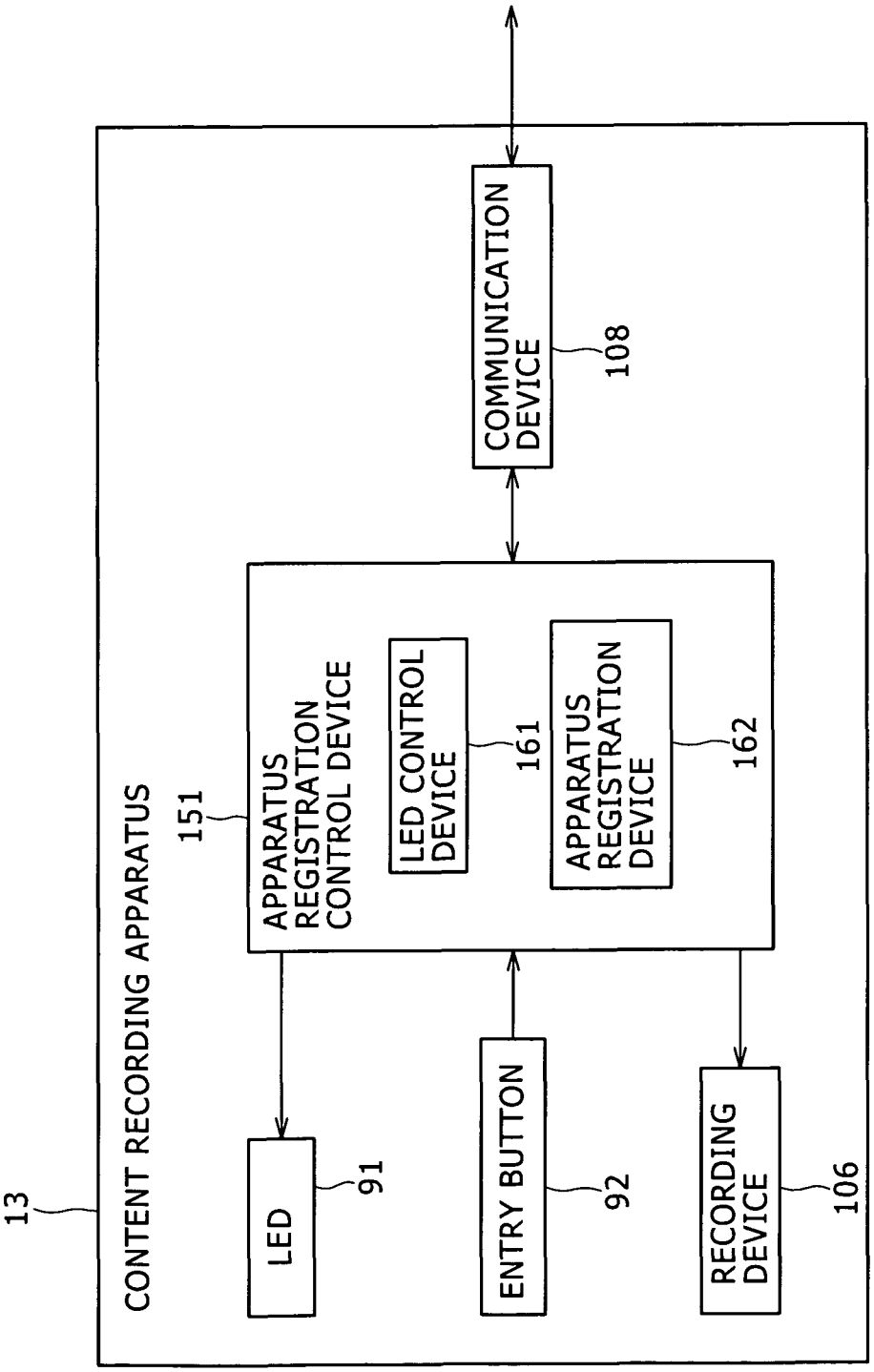
FIG. 6 is a block diagram showing a typical functional structure of the content recording apparatus.

FIG. 6 is a block diagram showing a typical functional structure of the content recording apparatus 13. The content recording apparatus 13 is structured to include the LED arrangement 91, entry button 92, recording device 106, communication device 108, and an apparatus registration control device 151.

Because the content recording apparatus 13 of this embodiment has the above-described hardware structure of FIG. 5, the apparatus registration control device 151 is furnished illustratively as application software to be carried out by the CPU 101 in FIG. 5. If the content recording apparatus 13 is designed to have a structure different from the hardware structure in FIG. 5, the apparatus registration control device 151 may be configured as a hardware unit or as a hybrid entity combining software with hardware elements.

The apparatus registration control device 151 performs steps to register the personal computer 11 with the content recording apparatus 13 as an apparatus authorized to receive delivered contents from the latter. At the same time, the apparatus registration control device 151 carries out steps to register the content recording apparatus 13 with the personal computer 11 as an apparatus authorized to deliver contents to the latter.

The apparatus registration control device 151 is structured to include an LED control device 161 and an apparatus registration device 162.

The LED control device 161 causes the LED arrangement 91 to light up, blink, and go out. Illustratively, the LED control device 161 receives through the communication device 108 an instruction (called the blink command hereunder) which comes from the personal computer 11 and which causes the selected apparatus to blink (light up) the LED arrangement 91. On the basis of the blink command received, the LED control device 161 causes the LED arrangement 91 to blink. When the user pushes the entry button 92, the LED control device 161 changes the blinking speed of the LED arrangement 91.

The apparatus registration device 162 performs steps to register the apparatus (e.g., personal computer 11) having selected the content recording apparatus 13, as an apparatus authorized to receive delivered contents from the selected apparatus.

Illustratively, the apparatus registration device 162 carries out an authentication process that compares the MAC (media access control) address included in the blink command sent from the personal computer 11, with the MAC address included in the registration command which comes from the apparatus (e.g., personal computer 11) having registered the content recording apparatus 13 and which requests registration of the personal computer 11 with the content recording apparatus 13. The MAC address, which may be replaced by other suitable ID information, identifies uniquely the apparatus that has sent the command containing the address. If the apparatus registration device 162 succeeds in uniquely identifying the apparatus of interest, the apparatus registration device 162 registers the ID by writing information about the apparatus of which the authentication has been successful, to an apparatus ID management table (called the delivery destination management table) stored in the recording device 10. The authentication process will be discussed later in more detail.

The process carried out by each of the components making up the content delivery system 1 will now be described. First to be described in reference to FIG. 7 will be an overview of the process performed by the content delivery system 1 as a whole. Later, the processing by the individual system components will be discussed.

Figure 7:
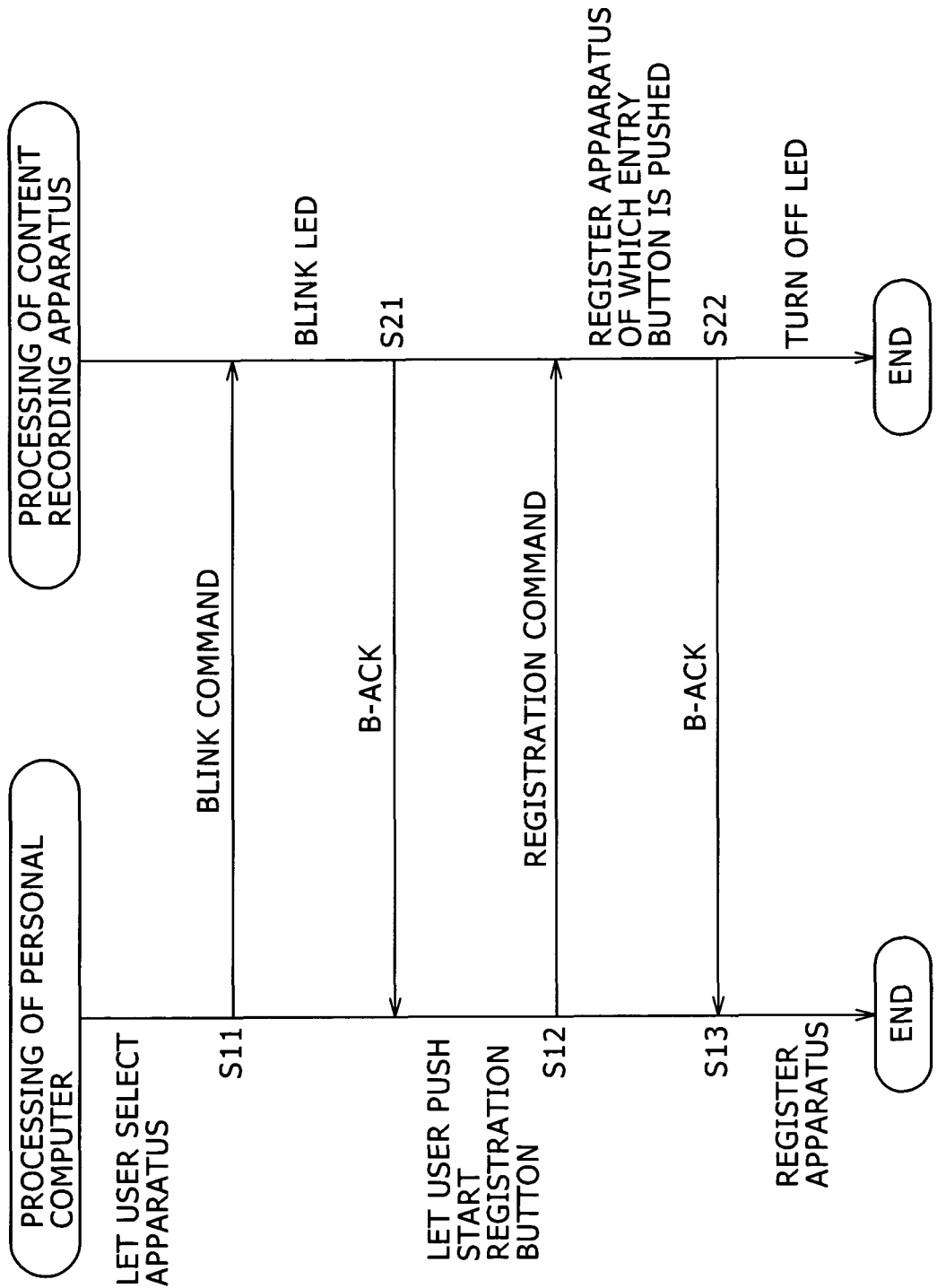
FIG. 7 is a schematic view explanatory of steps in which to register an apparatus with the content delivery system.

Outlined below with reference to FIG. 7 is how the content recording apparatus 13 in the content delivery system 1 of FIG. 1 registers the personal computer 11.

In step S11, the personal computer 11 lets the user select the content recording apparatus 13 to be registered. When the user performs an operation to select the content recording apparatus 13, the personal computer 11 sends a blink command to the selected apparatus 13.

Illustratively, the personal computer 11 in step S1 displays a list of the content recording apparatuses 13-1 through 13-N connected to the network 12 and prompts the user to select one of the listed apparatuses as the apparatus from which to receive delivered contents. If the user selects, say, the content recording apparatus 13-3, the personal computer 11 sends the blink command to the selected content recording apparatus 13-3 over the network 12.

In step S21, the content recording apparatus 13 receives the blink command sent from the personal computer 11 via the network 12. Given the blink command, the content recording apparatus 13 causes the LED arrangement 91 to blink. Upon succeeding in blinking the LED arrangement 91, the content recording apparatus 13 sends a notification called B-ACK to the personal computer 11 over the network 12, the notification informing the computer 11 of the successful LED blinking.

Illustratively, given the blink command from the personal computer 11 via the network 12, the content recording apparatus 13-3 in step S21 causes the LED arrangement 91 to blink. The content recording apparatus 13-3 then sends B-ACK to the personal computer 11 over the network 12, notifying the computer 11 that blinking of the LED arrangement 91 is successful.

In other words, the user first selects the content recording apparatus 13-3 out of the candidate content recording apparatuses 13-1 through 13-N presented by the personal computer 11. This causes the LED arrangement 91 of the selected content recording apparatus 13-3 to blink. The user visually inspects the blinking of the LED arrangement 91. The visual verification allows the user to recognize quickly and reliably that the content recording apparatus 13-3 has been selected from a plurality of content recording apparatuses 13-1 through 13-N.

In step S12, the personal computer 11 receives B-ACK sent from the content recording apparatus 13 over the network 12 and, based on the received B-ACK, renders active the button that may be operated by the user to start the process for registering the selected content recording apparatus 13 (the button is called the start registration button). When the start registration button is pushed by the user, the personal computer 11 sends a registration command to the selected content recording apparatus 13 via the network 12, the command requesting the selected apparatus 13 to register the personal computer 11.

Illustratively, given B-ACK from the content recording apparatus 13-3 over the network 12, the personal computer 11 in step S12 renders active the start registration button on the video server setting screen 201 (to be discussed later). When the user pushes the start registration button, the personal computer 11 sends the registration command to the content recording apparatus 13-3 via the network 12.

In step S22, the content recording apparatus 13 receives the registration command sent from the personal computer 11 over the network 12 and, based on the received registration command, waits for the entry button 92 to be operated by the user to permit registration of the personal computer 11 that has sent the registration command. When the entry button 92 is pushed by the user, the content recording apparatus 13 carries out an authentication process. If the authentication turns out to be successful, the content recording apparatus 13 registers the MAC address or other suitable ID that uniquely identifies the personal computer 11. In this manner, the personal computer 11 is registered with the content recording apparatus 13.

The content recording apparatus 13 sends a notification B-ACK to the personal computer 11 via the network 12, the notification informing the computer 11 of its registration with the apparatus 13. Then the content recording apparatus 13 causes the currently blinking LED arrangement 91 to go out.

Illustratively, the content recording apparatus 13-3 in step S22 receives the registration command from the personal computer 11 over the network 12. When the user pushes the entry button 92, the content recording apparatus 13-3 performs an authentication process. If the authentication turns out to be successful, the content recording apparatus 13-3 writes the MAC address of the personal computer 11 to the delivery destination management table for registration. The content recording apparatus 13-3 then sends B-ACK to the personal computer 11 via the network 12 and turns off the currently blinking LED arrangement 91.

In other words, the user verifies the selected content recording apparatus 13-3 by visually inspecting the blinking LED arrangement 91. After visual verification, the user pushes the entry button 92 on the content recording apparatus 13-3 to let the apparatus 13-3 register the personal computer 11.

In step S13, the personal computer 11 receives B-ACK from the content recording apparatus 13 over the network 12. Based on the received B-ACK, the personal computer 11 performs the process for registering the selected content recording apparatus 13.

Illustratively, the personal computer 11 in step S13 receives B-ACK from the content recording apparatus 13 over the network 12 and, based on the received B-ACK, writes information about the user-selected content recording apparatus 13-3 to the delivery source management table for registration.

In the manner described above, the content delivery system 1 carries out the processing whereby the content recording apparatus 13 registers the personal computer 11.

Described below with reference to the flowchart of FIG. 8 is an apparatus registration process performed by the personal computer 11.

In step S51, the apparatus detection device 61 detects the candidate apparatuses on the network 12. Illustratively, in response to the user's operation, the apparatus detection device 61 in step S51 detects at least one of the content recording apparatuses 13-1 through 13-N connected to the network 12. The process in which the personal computer 11 (i.e., its apparatus detection device 61) detects the candidate apparatuses on the network 12 will be discussed later in detail by referring to FIGS. 16 through 17D.

Figure 9:
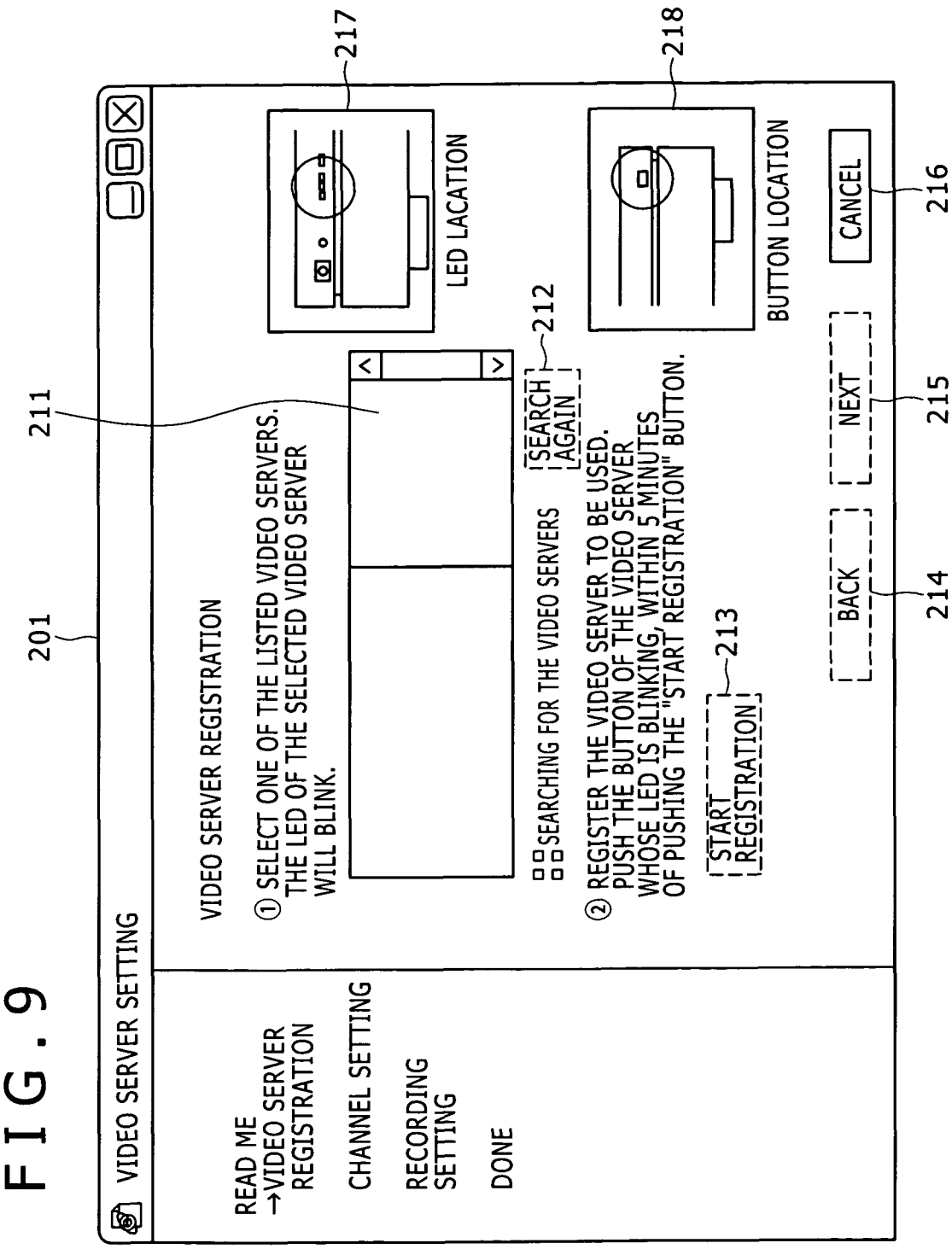
FIG. 9 is a schematic view showing a typical video server setting screen.

More specifically, if the user performs an operation to detect video servers (i.e., content recording apparatus 13), then the display control device 62 causes the display device 41 to display a video server setting screen 201 such as one shown in FIG. 9.

The video server setting screen 201 shown in FIG. 9 is a typical screen through which to register video servers. In the example of FIG. 9, a message "Searching for the video servers . . . " displayed to the left of a button 212 on the screen indicates that the apparatus detection device 61 is currently searching for the content recording apparatuses 13-1 through 13-N (i.e., video servers) connected to the network 12.

On the screen of FIG. 9, a list area 211 intended to display the names and IP addresses of detected video servers in list form is left blank because the search for the video servers is still in progress. On the screen of FIG. 9, the buttons 212, 213, 214 and 215 are shown in broken lines. That is because these buttons are inoperable at this point.

The button 212 is intended to start another search (i.e., detection) for the video servers; the button 213 to start the process for registering the video server to be used; and the button 214 to go back to the screen preceding the video server setting screen 201. For example, as shown on the left-hand side of the screen of FIG. 9, the video server setting screen 201 may have its menus switched cyclically from "Read me" to "Video server registration" to "Channel setting" to "Recording setting" to "Done." With the "Video server registration" menu currently in effect on the screen 201, operating the button 214 causes the screen 201 to go back to the preceding menu "Read me." The button 215 is intended to shift the video server setting screen 201 to the next menu. For example, operating the button 215 causes the screen 201 to go to the menu "Channel setting" that immediately follows the currently displayed "Video server registration" menu. Since the search for the video servers is still under way, these buttons remain inoperable.

A button 216 is shown in solid lines. If the user pushes the button 216, the apparatus detection device 61 cancels the ongoing process of video server detection halfway.

A screen 217 indicates to the user the location of the LED arrangement 91, as shown in FIG. 4, attached to the content recording apparatus 13. A screen 218 presents the user with the location of the entry button 92, as shown also in FIG. 4, on the content recording apparatus 13.

In step S52 back in the flowchart of FIG. 8, the display control device 62 causes the display device 41 to display on its screen a list of the detected apparatuses reflecting the result of the device detection process provided by the apparatus detection device 61.

Figure 10:
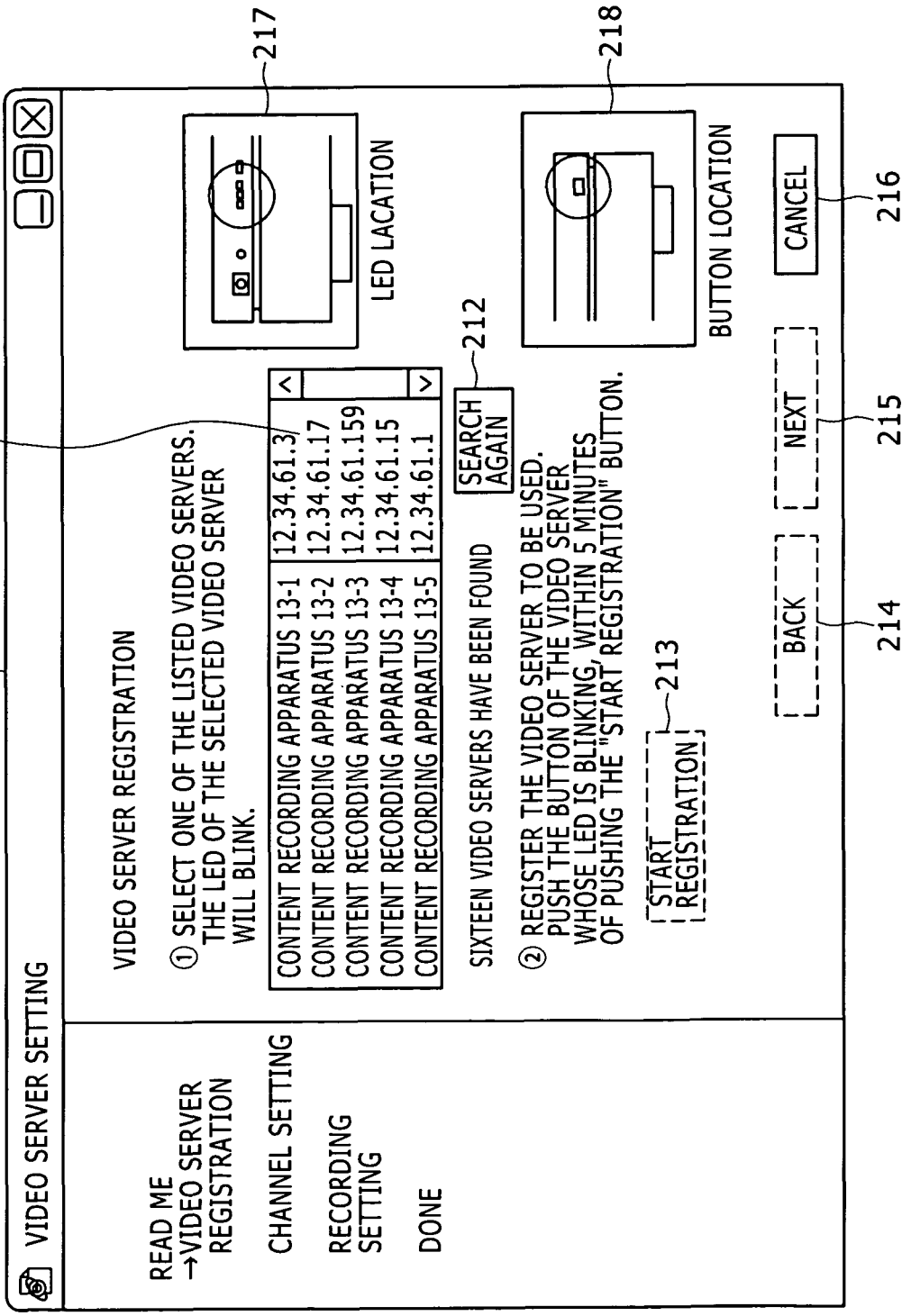
FIG. 10 is a schematic view showing another video server setting screen.

Illustratively, the display control device 62 in step S52 displays on the video server setting screen 201 a list 211 of 16 content recording apparatuses 13-1 through 13-16 which have been detected by the apparatus detection device 61 and which are connected to the network 12, as shown in FIG. 10.

In the example of FIG. 10, the list 211 shows in combination the names and IP (Internet Protocol) addresses of the content recording apparatuses 13-1 through 13-16 as the detected video servers. (In FIG. 10, only the content recording apparatus 13-1 through 13-5 are displayed for space reasons; the remaining apparatuses may be displayed by scrolling the list using a scroll bar.)

More specifically, the list 211 displays as the detected video servers the content recording apparatus 13-1 together with its assigned IP address "12.34.61.3," content recording apparatus 13-2 with the address "12.34.61.17," content recording apparatus 13-3 with the address "12.34.61.159," content recording apparatus 13-4 with the address "12.34.61.15," and content recording apparatus 13-5 with the address "12.34.61.1."

In the example of FIG. 10, the buttons 212 and 216 are rendered operable for the user to push. The buttons 213, 214 and 215 remain inoperable.

In step S53 back in the flowchart of FIG. 8, the apparatus registration control device 51 receives an operation signal from the input device 26 and, based on the received signal, checks to determine whether any one of the apparatuses displayed in the list is selected.

If in step S53 no apparatus is found selected from the list, then step S53 is reached again and the step is repeated. In other words, the personal computer 11 waits for the user to perform an operation to select any one of the content recording apparatuses 13-1 through 13-16 being displayed in the list 211 (FIG. 10).

If any one of the apparatuses displayed in the list is found selected in step S53, step S54 is reached. In step S54, the communication device 29 under control of the apparatus registration control device 51 sends a blink command to the selected apparatus via the network 12, the blink command causing the selected apparatus to blink its LED arrangement 91.

Figure 11:
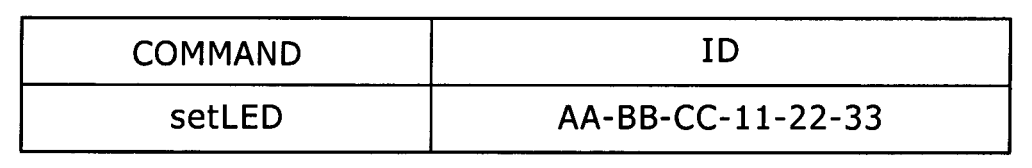

The blink command sent by the communication device 29 to the selected apparatus is illustratively composed of a command "setLED" and an ID "AA-BB-CC-11-22-33," as shown in FIG. 11. The ID may be a MAC address unique to each personal computer 11. The personal computer 11 is assigned the MAC address "AA-BB-CC-11-22-33" in advance.

Back in the flowchart of FIG. 8, the user may perform an operation in step S53 to select the content recording apparatus 13-3 out of the content recording apparatuses 13-1 through 13-16 displayed in the list 211 (FIG. 10). In this case, the communication device 29 goes to step S54 and, under control of the apparatus registration control device 51, sends the blink command (FIG. 11) to the content recording apparatus 13-3 over the network 12.

In step S55, the apparatus registration control device 51 causes the communication device 29 to determine whether or not B-ACK has been received, B-ACK being the notification that the apparatus to which the blink command was set has succeeded in lighting its LED arrangement 91.

Illustratively, the apparatus registration control device 51 in step S55 checks through the communication device 29 to determine if the content recording apparatus 13-3, to which the blink command was sent, has lighted its LED arrangement 91 and returned B-ACK.

If in step S55 B-ACK is not found to have been received, step S56 is reached. In step S56, the apparatus registration control device 51 carries out a waiting time updating process. That is, the apparatus registration control device 51 advances the waiting time in predetermined increments.

The waiting time in this context is a time period in which the personal computer 11 waits for B-ACK to be received from the apparatus to which the blink command was sent over the network 12. Upon elapse of the waiting time, the personal computer 11 terminates halfway the apparatus registration process.

In step S57, the apparatus registration control device 51 checks to determine whether or not the predetermined waiting time has elapsed.

If in step S57 the predetermined waiting time is found to have elapsed, the apparatus registration control device 51 interprets the absence of B-ACK to mean that the content recording apparatus 13-3 to which the blink command was sent has failed to light its LED arrangement 91 within a predetermined time period (i.e., within the waiting time). In that case, the apparatus registration control device 51 illustratively causes the display device 41 to display on its screen a message telling the user that the content recording apparatus 13-3 has failed to light its LED arrangement 91. The apparatus registration process is then brought to an end.

If in step S57 the predetermined waiting time is not found to have elapsed yet, then step S55 is reached again and the subsequent steps are repeated. That is, during the predetermined waiting time, the personal computer 11 waits for B-ACK to be returned by the content recording apparatus 13-3 to which the blink command was sent.

If in step S55 B-ACK is found received within the predetermined waiting time, step S58 is reached. In step S58, the display control device 62 renders the start registration button active on the basis of B-ACK which has been sent from the selected apparatus by way of the communication device 29.

Figure 12:
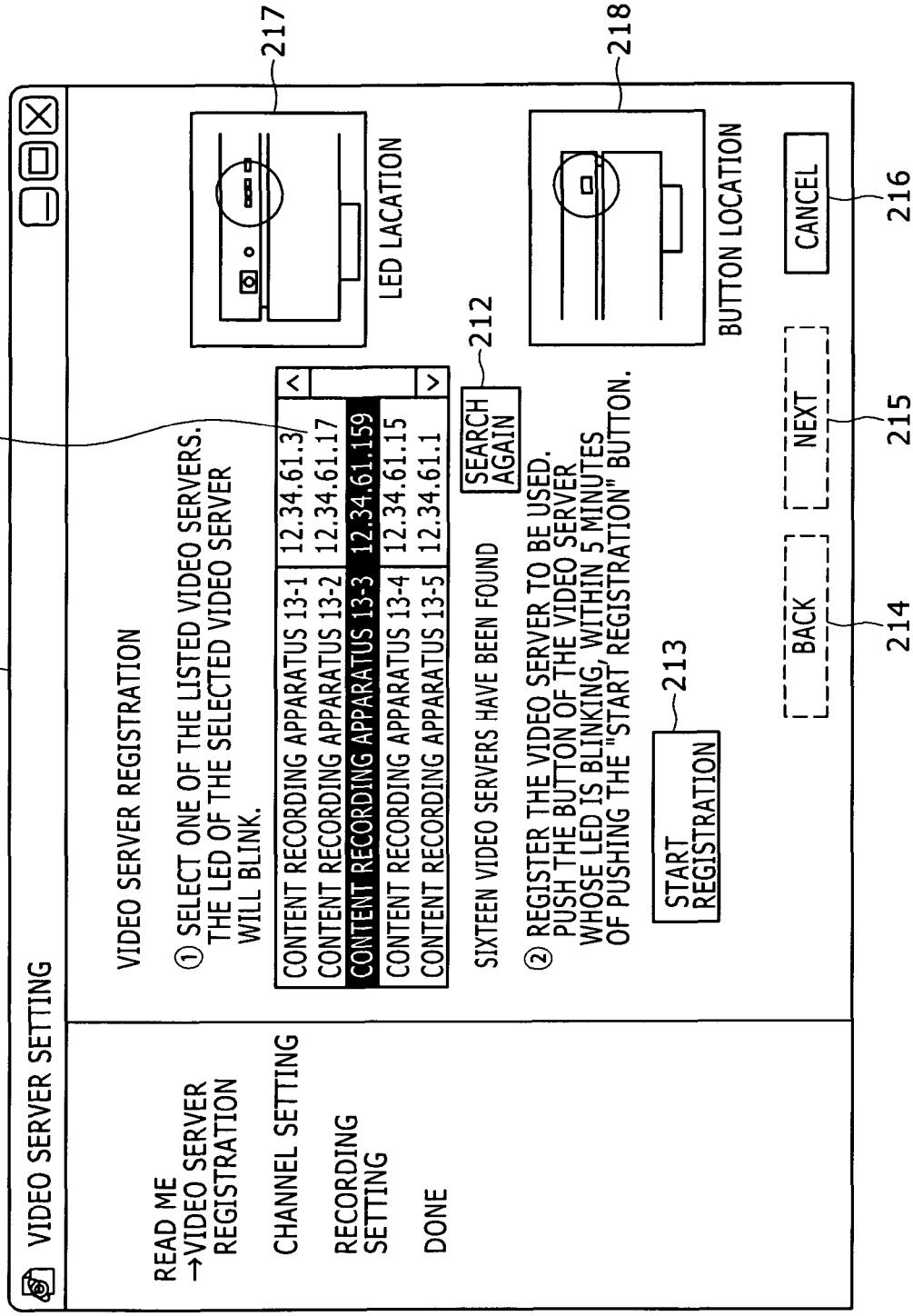
FIG. 12 is a schematic view showing another video server setting screen.

Illustratively, the display control device 62 in step S58 receives B-ACK from the content recording apparatus 13-3 through the communication apparatus 29 and, based on the received B-ACK, renders active the button 213 that the user may operate to start the process for registering the selected apparatus, as shown in FIG. 12. (In the example of FIG. 12, the button 213 is shown operable in solid lines as opposed to its counterpart in broken lines in FIG. 10.)

In the example of FIG. 12, the button 213 is rendered active for the user to push. The user may push the button 213 to start the predetermined process for registering the selected apparatus (content recording apparatus 13-3 in this case).

In the example of FIG. 12, the buttons 212 and 216 are shown operable and the buttons 214 and 215 inoperable for the user. In the list 211, the indication "content recording apparatus 13-3" is displayed in reverse video together with its assigned IP address "12.34.61.159" following the user's operation to select the apparatus 13-3.

In step S59, the apparatus registration control device 51 receives an operation signal from the input device 26 and, based on the received signal, checks to determine whether or not the start registration button is pushed by the user to start the process for registering the selected apparatus.

If the predetermined time period is found to have elapsed or if the process for registering the content recording apparatus 13-3 is canceled halfway in step S59, the start registration button is found yet to be pushed. In such a case, the apparatus registration control device 51 causes the display device 41 to display on its screen a message telling the user that the content recording apparatus 13-3 could not be registered. The apparatus registration process is then terminated.

If in step S59 the start registration button is found pushed, then step S60 is reached. In step S60, the communication device 29 under control of the apparatus registration control device 51 sends a registration command to the selected apparatus over the network 12, the command requesting the selected apparatus to register the personal computer 11.

Figure 13:
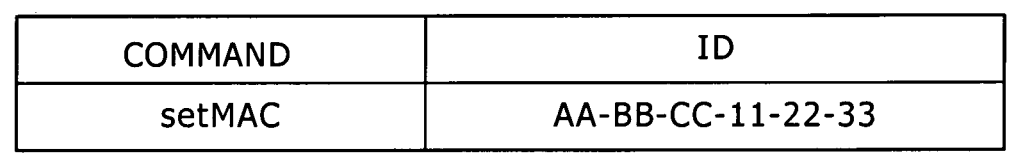

The registration command sent by the communication device 29 to the selected apparatus is illustratively made up of a command "setMAC" and an ID "AA-BB-CC-11-22-33," as shown in FIG. 13. As in the case of the above-described blink command (FIG. 11), the registration command may be the MAC address assigned uniquely to each personal computer 11.

Back in the flowchart of FIG. 8, suppose that the user has pushed the button 213 (FIG. 12). In that case, step S60 is reached and the communication device 29 under control of the apparatus registration control device 51 sends the registration command (FIG. 13) to the content recording apparatus 13-3 via the network 12.

In step S61, the apparatus registration control device 51 checks through the communication device 29 to determine whether or not B-ACK has been received, B-ACK indicating that the selected apparatus has succeeded in authenticating the apparatus that had sent in the registration command and has registered the command-originating apparatus (i.e., information about the apparatus).

Illustratively, the apparatus registration control device 51 in step S61 checks through the communication device 29 to determine whether or not B-ACK has been returned from the content recording apparatus 13-3 to which the registration command was sent from the personal computer 11. The response "B-ACK" returned via the network 12 indicates that the apparatus 13-3 authenticated the personal computer 11 as a legitimate apparatus and has registered its ID.

If in step S61 B-ACK is not found to be received, then step S62 is reached. In step S62, the apparatus registration control device 51 carries out a waiting time updating process. That is, the apparatus registration control device 51 advances the waiting time in predetermined increments.

Figure 14:
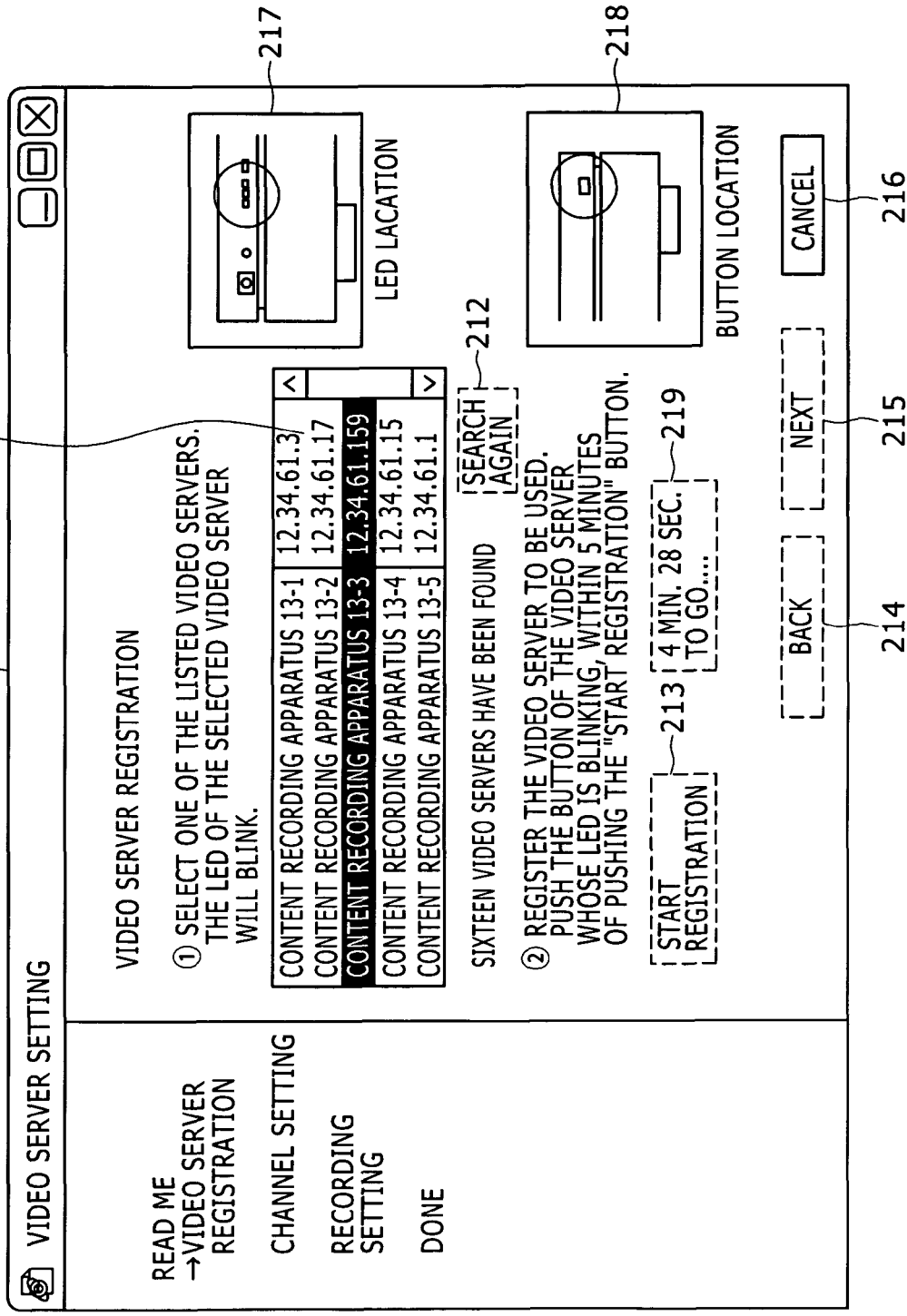
FIG. 14 is a schematic view showing another video server setting screen.

Illustratively, if the waiting time is set for five minutes, the apparatus registration control device 51 in step S62 starts counting down from the preset five (5) minutes. As shown in FIG. 14, the apparatus registration control device 51 then causes the display device 41 to display on its screen a remaining time 219 "4 min. 28 sec. to go . . . ."

In step S63 back in the flowchart of FIG. 8, the apparatus registration control device 51 checks to determine whether or not the predetermined waiting time has elapsed.

If in step S63 the predetermined waiting time is found to have elapsed, the apparatus registration control device 51 interprets the absence of B-ACK to mean that the content recording apparatus 13-3 to which the registration command was sent has failed to register the personal computer 11. In that case, the apparatus registration control device 51 illustratively causes the display device 41 to display on its screen a message telling the user that the content recording apparatus 13-3 has failed to register the personal computer 11. The apparatus registration process is then brought to an end.

If in step S63 the predetermined waiting time is not found to have elapsed yet, then step S61 is reached again and the subsequent steps are repeated. That is, during the predetermined waiting time, the personal computer 11 waits for B-ACK to be returned by the content recording apparatus 13-3 having successfully authenticated and registered the personal computer 11.

If in step S61 B-ACK is found to have been received, then step S64 is reached. In step S64, the apparatus registration device 63 registers the selected apparatus on the basis of B-ACK that was received from the selected apparatus through the communication device 29 via the network 12. The apparatus registration process is then terminated.

Figure 15:
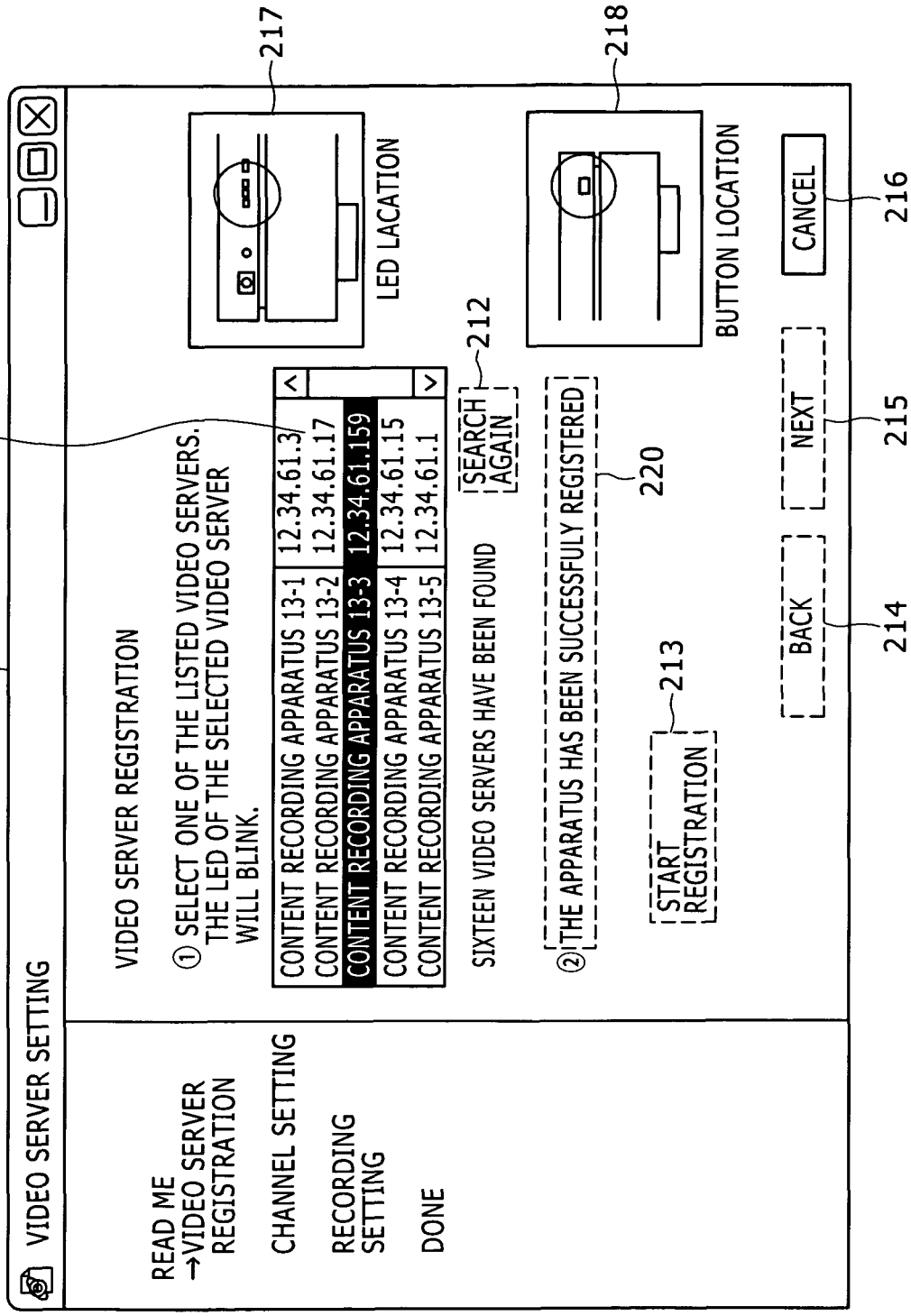
FIG. 15 is a schematic view showing another video server setting screen.

Illustratively, the apparatus registration device 63 makes the registration by storing (information about) the selected content recording apparatus 13-3 to the delivery source management table held illustratively in the recording device 28, on the basis of B-ACK that was received from the apparatus 13-3 via the network 12 and through the communication device 29. The apparatus registration control device 51 then displays on the screen a message 220 telling the user that "The apparatus has been successfully registered," as shown in FIG. 15.

As described, when the user wants to register the personal computer 11 with the selected apparatus out of a plurality of candidate apparatuses, the personal computer 11 is first arranged to send a blink command to the apparatus of interest. Depending on the response to the blink command, the personal computer 11 sends a registration command to the selected apparatus. In keeping with the response to the registration command, the personal computer 11 has itself registered with the selected apparatus. In this manner, the user can select any one of multiple apparatuses and have the personal computer 11 registered with the selected apparatus easily and reliably.

A list of candidate apparatuses connected to the network 12 is displayed so that the user may select any one of the listed apparatuses. The selected apparatus is prompted to blink its LED arrangement. This allows the user to associate the name of the selected apparatus in the list with the LED arrangement physically attached to the apparatus.

Figure 16:
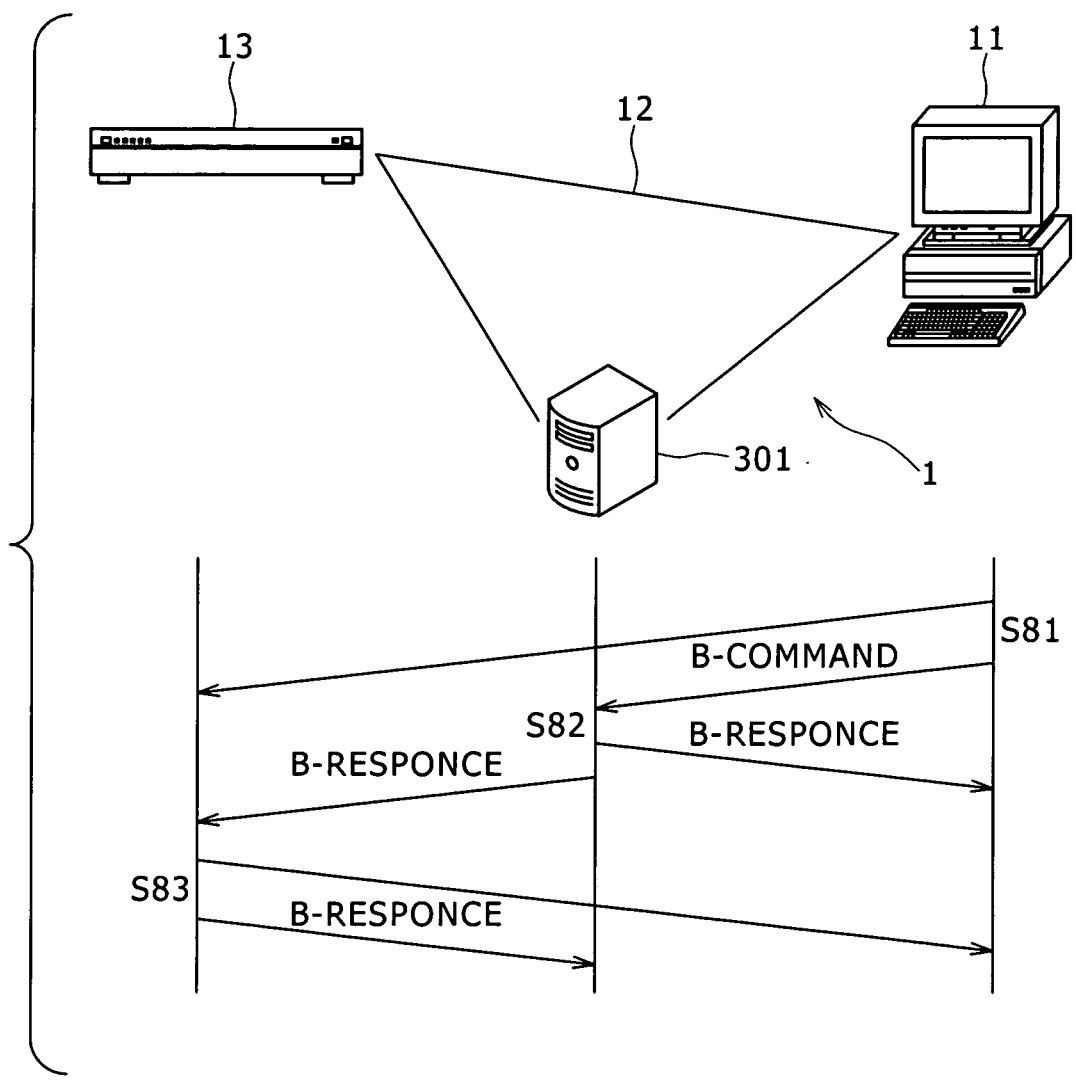
FIG. 16 is a schematic view explanatory of steps in which the personal computer detects apparatuses connected to a network.
Figure 17A:
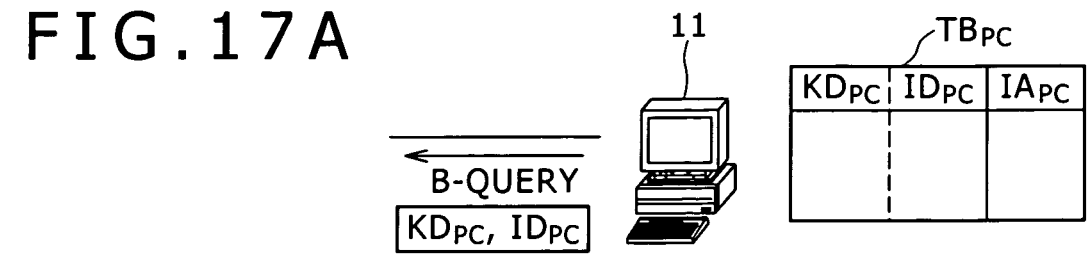
FIGS. 17A to 17D are schematic views explanatory of detailed steps in which the personal computer detects apparatuses connected to the network.
Figure 17B:
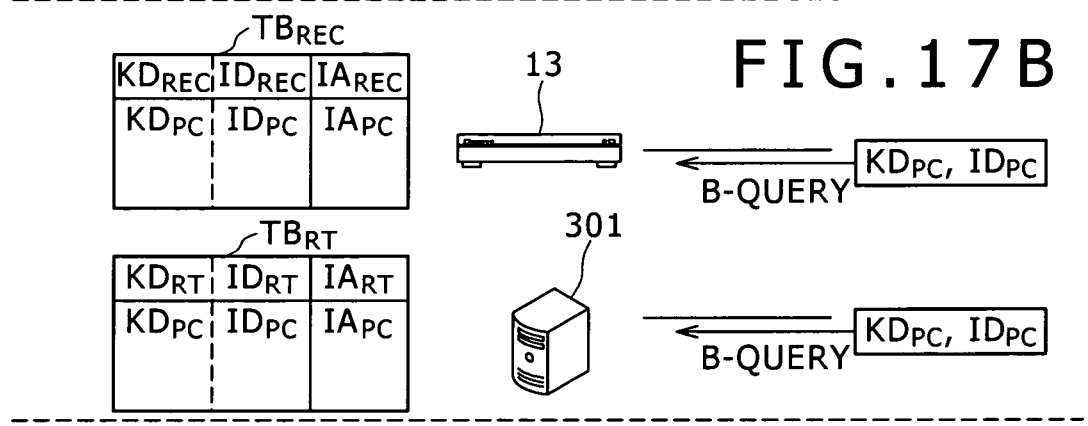
Figure 17C:
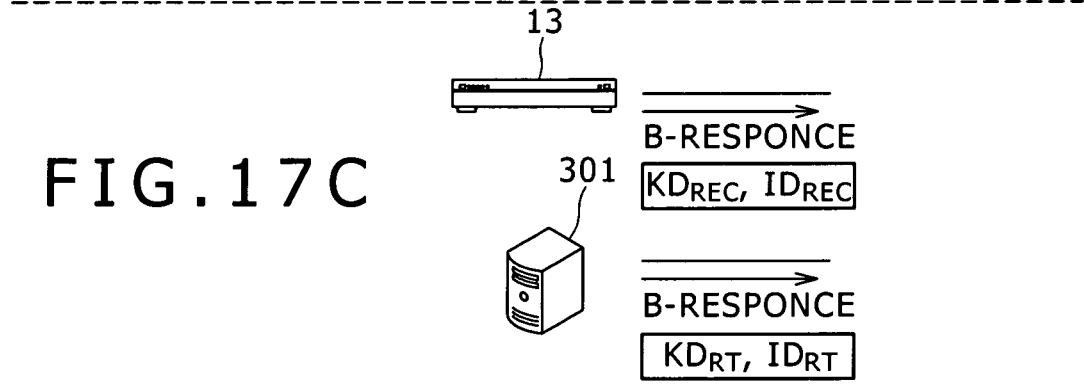
Figure 17D:
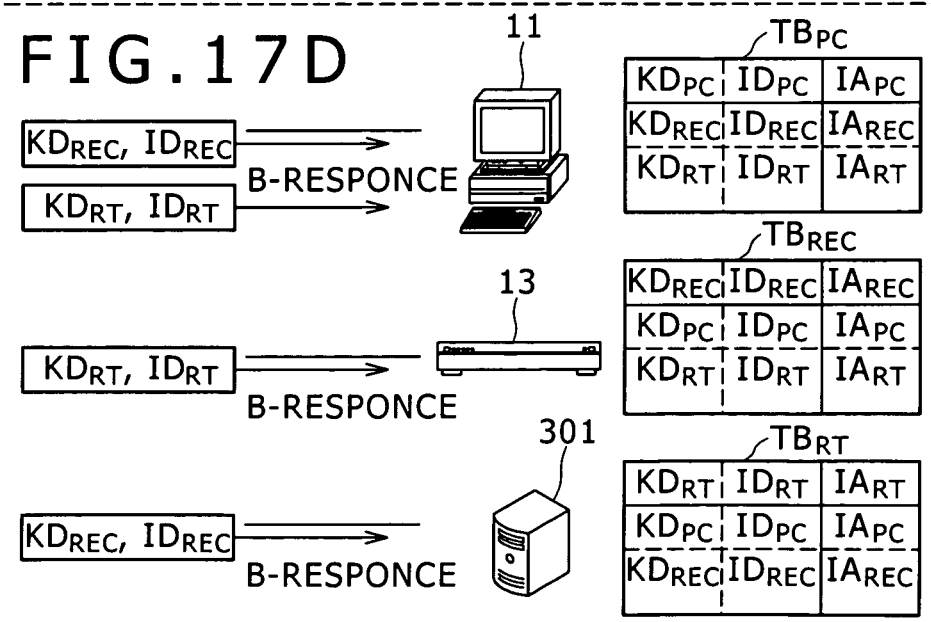

Described below in detail with reference to FIGS. 16 through 17D is the process in which the personal computer 11 (i.e., apparatus detection device 61) detects candidate apparatuses on the network 12. This process is formed by detailed steps constituting step S51 in FIG. 8.

First to be described in reference to FIG. 16 is an outline of the process for the personal computer 11 to detect the apparatuses connected to the network 12. In the content delivery system 1 of FIG. 16, the personal computer 11, content recording apparatus 13, and a router 301 are connected to the network 12.

In the example of FIG. 16, the router 301 relaying the network 12 to another network is shown as a typical apparatus connected to the network 12 for purpose of simplification and illustration. Alternatively, the router 301 may be replaced by another content recording apparatus different from the content recording apparatus 13 shown connected to the network 12 in FIG. 16, or by any other apparatus capable of connecting to the network 12.

When detecting apparatuses connected to the network 12 in the example of FIG. 16, the personal computer 11 proceeds as follows: in step S81, the personal computer 11 broadcasts B-COMMAND over the network 12. That is, B-COMMAND issued by the personal computer 11 is sent to the content recording apparatus 13 and to the router 301 via the network 12.

B-COMMAND is a packet issued by the personal computer 11 with a view to causing other apparatuses to carry out a predetermined process. Illustratively, when it is time to detect the apparatuses connected to the network 12, the personal computer 11 broadcasts B-COMMAND (e.g., query packet called "B-QUERY" to be discussed later) over the network 12.

In step S82, the content recording apparatus 13 broadcasts B-RESPONSE over the network 12 upon receipt of B-COMMAND from the personal computer 11. That is, B-RESPONSE issued by the content recording apparatus 13 is sent to the personal computer 11 as well as to the router 301 via the network 12.

In step S83, the router 301 likewise broadcasts B-RESPONSE over the network 12 upon receipt of B-COMMAND from the personal computer 11. That is, B-RESPONSE issued by the router 301 is sent to the personal computer 11 and to the router 301 via the network 12.

At this point, the personal computer 11 receives B-RESPONSE from both the content recording apparatus 13 and the router 301 via the network 12. In this manner, the personal computer 11 acquires from the received B-RESPONSE information about the apparatuses that have returned their responses. On the basis of the information thus acquired, the personal computer 11 detects the apparatuses connected to the network 12.

The process in which the personal computer 11 detects apparatuses connected to the network 12, as discussed above by referring to FIG. 16, will now be described in more detail with reference to FIGS. 17A through 17D.

As shown in FIG. 17A, when it is time to update the list 211, as when the user pushes the button 212 on the video server setting screen 201 to again search for (i.e., detect) the candidate apparatuses, the apparatus detection device 61 of the personal computer 11 creates a query packet (e.g., B-QUERY) using a kind $KD_{PC}$ and a unique identifier $ID_{PC}$ of the personal computer 11 kept beforehand in an identifier-to-kind correspondence table $TB_{PC}$ in which the identifier corresponds to the kind, and which is held in the recording device 28. The apparatus detection device 61 broadcasts the created query packet over the network 12 through the communication device 29.

Upon receipt of the query packet sent from the personal computer 11 over the network 12, as shown in FIG. 17B, the communication device 108 of the content recording apparatus 13 retrieves from the received packet the kind $KD_{PC}$ and unique identifier $ID_{PC}$ of the personal computer 11 and stores the retrieved information into the identifier-to-type correspondence table $TB_{REC}$ of the apparatus 13 in the recording device 106 for registration.

The apparatus registration control device 151 of the content recording apparatus 13 creates a response packet (e.g., B-RESPONSE), as shown in FIG. 17C, using the kind $KD_{REC}$ and unique identifier $ID_{REC}$ of the recording apparatus 13 kept in advance in the identifier-to-kind correspondence table $TB_{REC}$ of the apparatus 13. The apparatus registration control device 151 causes the communication device 108 to broadcast the created response packet over the network 12.

Likewise, upon receipt of the query packet sent from the personal computer 11 via the network 12, as shown in FIGS. 17B and 17C, the router 301 retrieves from the received packet the kind $KD_{PC}$ and unique identifier $ID_{PC}$ of the personal computer 11 and stores the retrieved information into the identifier-to-kind correspondence table $TB_{RT}$ of the router 301 for registration. In response to the query packet, the router 301 creates a response packet (e.g., B-RESPONSE) using its kind $KD_{RT}$ and its unique identifier $ID_{RT}$ kept beforehand in the identifier-to-kind correspondence table $TB_{RT}$, and broadcasts the created response packet over the network 12.

As shown in FIG. 17D, the communication device 29 of the personal computer 11 receives the response packets (B-RESPONSE) broadcast by the content recording apparatus 13 and by the router 301, and forwards the received packets to the apparatus detection device 61. The apparatus detection device 61 retrieves from the received packets the kind $KD_{REC}$ and unique identifier $ID_{REC}$ of the content recording apparatus 13 as well as the kind $KD_{RT}$ and unique identifier $ID_{RT}$ of the router 301, and stores the retrieved information into the identifier-to-kind correspondence table $TB_{PC}$ held in the storage device 28 for registration. After registering the kinds KD and unique identifiers ID, the apparatus detection device 61 discards the response packets having been received.

As a result, the personal computer 11 retains the identifier-to-kind correspondence table $TB_{PC}$ with its kinds KD and unique identifiers ID updated in regard to the content recording apparatus 13 and router 301. That is, when it is time to update the list 211, the personal computer 11 has its identifier-to-kind correspondence table $TB_{PC}$ updated to reflect the latest information about the apparatuses connected to the network 12.

On the basis of the identifier-to-kind correspondence table $TB_{PC}$ kept in the recording device 28, the display control device 62 of the personal computer 11 controls the display of the video server setting screen 201 in such a manner that the content recording apparatus 13 (as well as the router 301) will be displayed in the list 211 as the candidate apparatus on the network 12.

The identifier-to-kind correspondence table $TB_{PC}$ retains the names of the candidate apparatuses on the network and information about the IP addresses assigned to these apparatuses. When the table $TB_{PC}$ is updated in the recording device 28, the display control device 62 causes the video server setting screen 201 to reflect the updates regarding the names of the apparatuses connected to the network 12 and the IP addresses of these apparatuses, as shown in the list 211 of FIG. 10.

When broadcasting their kinds KD and unique identifiers ID, the personal computer 11, content recording apparatus 13, and router 301 send out under UDP (User Datagram Protocol) the IP addresses $IA_{PC}$, $IA_{REC}$, and $IA_{RT}$ assigned respectively to them, as shown in FIGS. 17B and 17C. The personal computer 11, content recording apparatus 13, and router 301 each receive the kinds KD and unique identifiers ID of the responding apparatuses, combine the received data with the IP addresses IA sent from the apparatuses in question under UDP, and store the combinations to be registered into the identifier-to-kind correspondence table TB that each of the personal computer 11, content recording apparatus 13, and router 301 possesses.

Likewise, as shown in FIG. 17D, the content recording apparatus 13 holds the identifier-to-kind correspondence table $TB_{REC}$ in which the kinds KD and unique identifiers ID of the personal computer 11 and router 301 may be updated. The router 301 retains the identifier-to-kind correspondence table $TB_{RT}$ in which the kinds KD and unique identifiers ID of the personal computer 11 and content recording apparatus 13 may be updated.

According to the present invention, solely the content of the identifier-to-kind correspondence table $TB_{PC}$ is to be updated. That is because the apparatuses connected to the network 12 need only be displayed in the list 211 of the video server setting screen 201 displayed on the display device 41 of the personal computer 11. It is not mandatory to update what is contained in the identifier-to-kind correspondence tables of the apparatuses connected to the network 12 (e.g., tables $TB_{REC}$ and $TB_{RT}$).

In the manner described above, the personal computer 11 searches for and detects the candidate apparatuses connected to the network 12.

Described below with reference to the flowchart of FIG. 18 is the apparatus registration process carried out by the content recording apparatus 13. The steps in FIG. 18 constitute illustratively the process to be performed by the content recording apparatus 13-3 that was registered with the personal computer 11 as a content delivery source as discussed above in conjunction with the flowchart of FIG. 8.

In step S101, the apparatus registration control device 151 checks through the communication device 108 to determine whether or not a blink command has been received from the personal computer 11 or like equipment.

If in step S101 the blink command is not found to be received, control is returned to step S101 and the check is repeated. That is, the content recording apparatus 13 waits for the blink command to be sent from the personal computer 11 or the like over the network 12.

If in step S101 the blink command is found to be received, step S102 is reached. In step S102, the apparatus registration control device 151 clears a predetermined waiting time.

The waiting time in this context is a predetermined time period in which the content recording apparatus 13 waits for a predetermined process to be completed. Upon elapse of the waiting time, the content recording apparatus 13 terminates the ongoing apparatus registration process halfway.

In step S103, the LED control device 161 causes the LED arrangement 91 to blink at a predetermined speed in accordance with the blink command. The blink command has been received from the personal computer 11 or the like through the communication device 108.

Illustratively, the LED control device 161 in step S103 causes the LED arrangement 91 to blink at the predetermined speed based on "setLED" (FIG. 11) contained in the blink command sent from the personal computer 11 through the communication device 108.

The user visually inspects the LED arrangement blinking at the predetermined speed on the user-selected apparatus. This makes it possible for the user to spot the selected apparatus quickly and reliably from among a plurality of candidate apparatuses.

In step S104, the apparatus registration device 162 causes the recording device 106 to record an ID retrieved from the received blink command. The ID, uniquely identifying the apparatus having sent the blink command, is found in that command sent from the personal computer 11 or the like through the communication device 108.

Illustratively, the apparatus registration device 162 in step S104 stores a MAC address "AA-BB-CC-11-22-33" contained in the blink command (FIG. 11) into the delivery destination management table kept in the recording device 106. The MAC address found in the blink command serves as the ID that uniquely identifies the personal computer 11 having sent in the command by way of the communication device 108.

In step S105, the communication device 108 under control of the apparatus registration control device 151 sends B-ACK via the network 12 to the personal computer 11 or the like that has sent the blink command, B-ACK being the notification that the blinking of the LED arrangement 91 is successful in keeping with the blink command.

In step S106, the apparatus registration control device 151 checks through the communication device 108 to determine whether or not a registration command has been received from the personal computer 11 or like equipment.

If in step S106 the registration command is not found to be received yet, step S107 is reached. In step S107, the apparatus registration control device 151 carries out a waiting time updating process. At this point, the apparatus registration control device 151 advances in predetermined increments the wanting time that was cleared in step S102.

In step S108, the apparatus registration control device 151 checks to determine whether or not the predetermined waiting time has elapsed.

If in step S108 the waiting time is found to have elapsed, with no registration command returned from the personal computer 11 to which B-ACK was sent, the apparatus registration control device 151 determines that the personal computer 11 has failed to register the content recording apparatus 13-3. In that case, step S109 is reached and the LED control device 161 turns off the blinking LED arrangement 91. This terminates the apparatus registration process.

If in step S108 the waiting time is not found to have elapsed yet, then step S106 is reached again and the subsequent steps are repeated. That is, the content recording apparatus 13 waits during the predetermined time period for "setMAC," contained in the registration command (FIG. 13), to be sent from the personal computer 11 to which B-ACK was sent.

If in step S106 the registration command is found to have been received, step S110 is reached. In step S110, the apparatus registration control device 151 checks to determine whether the user has pushed the entry button 92 on the basis of an operation signal that will come from the entry button 92 if the latter is operated.

If in step S110 the entry button 92 is not found to be pushed, step S111 is reached. In step S111, the apparatus registration control device 151 performs a waiting time updating process. At this point, the apparatus registration control device 151 advances the waiting time in predetermined increments.

In step S112, the apparatus registration control device 151 checks to determine whether the predetermined waiting time has elapsed.

If in step S112 the waiting time is found to have elapsed, with the entry button 92 not pushed by the user within the predetermined time period, the apparatus registration control device 151 determines that the personal computer 11 has failed to register the content recording apparatus 13-3. In that case, step S109 is reached and the LED control device 161 turns off the blinking LED arrangement 91. This brings the apparatus registration process to an end.

If in step S110 the entry button 92 is found to have been pushed, step S113 is reached. In step S113, the LED control device 161 changes the blinking speed of the LED arrangement 91.

Illustratively, the LED control device 161 in step S113 raises the blinking speed of the LED arrangement 91 that was lighted in step S103. The increased blinking speed allows the user visually to ascertain that the content recording apparatus 13-3 is carrying out a process for registering the personal computer 11.

By looking at the blinking LED arrangement 91, the user first verifies that the content recording apparatus 13-3 has been selected. After the verification, the user pushes the entry button 92 furnished on the content recording apparatus 13-3, causing the apparatus 13-3 to register the personal computer 11 as evidenced by the change in the blinking speed of the LED arrangement 91.

In step S114, the apparatus registration device 162 checks to determine whether or not the apparatus ID contained in the blink command matches with the ID found in the registration command.

Illustratively, the apparatus registration device 162 in step S114 checks to determine whether or not there is a match between the ID of the personal computer 11 (e.g., MAC address "AA-BB-CC-11-22-33") contained in the blink command (FIG. 11) received earlier and placed into the delivery destination management table in the recording device 106 on the one hand, and the ID of the personal computer 11 (e.g., MAC address "AA-BB-CC-11-22-33") found in the registration command (FIG. 13) received subsequently on the other hand.

If an ID mismatch is detected in step S114, that means the apparatus that sent in the subsequent command is different from the apparatus that transmitted its command earlier. The mismatch annuls the process of apparatus registration. In this case, steps S115 and S116 are skipped and step S109 is reached. The LED control device 161 then turns off the LED arrangement 91, and the apparatus registration process is terminated.

The apparatus registration device 162 registers the apparatus that sent in the registration command only if its ID matches with that of the apparatus which transmitted its command earlier. That is, only the apparatus that sent both the blink command and the registration command is registered.

If in step S114 a match is detected between the compared IDs, then step S115 is reached. In step S115, the apparatus registration device 162 records to the recording device 106 the ID contained in the registration command, whereby the apparatus that sent in the registration command is registered.

Illustratively, the apparatus registration device 162 in step S115 stores the ID of the personal computer 11 (e.g., MAC address "AA-BB-CC-11-22-33") found in the registration command (FIG. 13) into the delivery destination management table held in the recording device 106. This accomplishes registration of the personal computer 11 that transmitted the registration command.

In step S116, the communication device 108 under control of the apparatus registration control device 151 sends B-ACK to the personal computer 11 or like equipment over the network 12, B-ACK being the notification that the personal computer 11 has been successfully authenticated and registered. With the registration process completed, step S109 is reached and the LED control device 161 turns off the rapidly blinking LED arrangement 91. This terminates the apparatus registration process.

As described, the content recording apparatus 13 first blinks its LED arrangement in response to the blink command sent from the apparatus that is requesting registration of the apparatus 13. Later, upon receipt of the registration command from the requesting apparatus, the user pushes the entry button on the apparatus 13 allowing the latter to be registered with the requesting apparatus. In this manner, the user can selectively register his or her desired apparatus easily and reliably out of a plurality of candidate apparatuses.

The personal computer 11 prompts the selected content recording apparatus 13 to blink its LED arrangement 91 and causes the LED-blinking apparatus 13 to register the PC. When the user pushes the entry button 92 on the content recording apparatus 13 with its LED arrangement 91 blinking, the personal computer 11 is registered with the apparatus 13. In other words, if the content recording apparatus 13 is located too far away from the personal computer 11, the user will find it difficult physically to check the LED arrangement 91 or to operate the entry button 92. The two pieces of equipment should preferably be set up within a reasonably short distance of each other to permit the user's easy access to both.

As a result, the PC or other suitable apparatus located too far away from the content recording apparatus 13 is incapable of registering the latter, whereby security is enhanced. Only the equipment that has registered the content recording apparatus 13 by the above-described registering method is authorized to make or cancel recording reservations on the apparatus 13. That is, only the "secured" equipment can make use of the content recording apparatus 13.

As described, the embodiment of the present invention allows the user to make communication settings easily and reliably. According to the invention, the user-selected apparatus can be registered easily and reliably out of a plurality of candidate apparatuses.

In the foregoing description, the content recording apparatus 13 was shown to be the apparatus that registers the personal computer 11 according to the present invention. Alternatively, other suitable equipment capable of connecting to the network 12, such as a TV set, another PC, or some other home information appliance may be used to register the personal computer 11. Also in the foregoing description, the personal computer 11 was shown to be the apparatus that registered with the content recording apparatus 13 according to the present invention. Alternatively, other appropriate equipment capable of connecting to the network 12, such as a mobile phone, a PDA (personal digital assistant), a game console, or another home information appliance may be used to registered with the content recording apparatus 13.

The series of steps or processes described above may be executed either by hardware or by software. For the software-based processing to take place, the programs constituting the software may be either incorporated beforehand in dedicated hardware of the computer or installed upon use from a suitable recording medium into a general-purpose personal computer or like equipment capable of executing diverse functions based on the installed programs.

The recording medium is offered to the user not only as the removable recording medium 31 in FIG. 2 or 112 in FIG. 5 apart from his or her computer and constituted by a magnetic disk (including flexible disks), an optical disk (including CD-ROM (compact disc-read only memory) and DVD), a magneto-optical disk (including MD (Mini-disc; registered trademark)), or a semiconductor memory, each medium carrying the necessary programs; but also in the form of the ROM 22 or recording device 28 in FIG. 2 or the ROM 102 or recording device 106 in FIG. 5, each accommodating the programs and incorporated beforehand in the computer.

The programs for executing the above-described series of steps may alternatively be installed into the computer through diverse interfaces such as routers or modems by way of wired or wireless communication media including local area networks, the Internet, or digital satellite broadcasts.

In this specification, the steps which describe the programs stored on the recording medium represent not only the processes that are to be carried out in the depicted sequence (i.e., on a time series basis) but also processes that may be performed parallelly or individually and not chronologically.

In this specification, the term "system" refers to an entire configuration made up of a plurality of component devices or apparatuses.

While preferred embodiments of the present invention have been described using specific terms, such description is for illustrative purpose only, and it is to be understood that changes and variations may be made without departing from the spirit or scope of the following claims.

What is claimed is:

1. A communication system for enabling communication among communication apparatuses over a network, comprising:
a first communication apparatus including
means for detecting second communication apparatuses connected to said network as detected second communication apparatuses using a query packet including a device kind identifier, a unique identifier ID and an IP address of the first communication apparatus,
means for receiving response packets from the second communication apparatuses, each of the response packets including a device kind identifier, a unique identifier ID and an IP address of a corresponding one of the second communication apparatuses,
means for storing the device kind identifiers, the unique identifier IDs and the IP addresses included in each of the received response packets from the second communication apparatuses in an identifier-to-kind correspondence table stored in the first communication apparatus;
means for controlling display of a screen showing a list of said detected second communication apparatuses based on the received response packets, and
means for transmitting the query packet, a first request and a second request to a selected second communication apparatus of said detected second communication apparatuses based upon corresponding user selections,
wherein said first request is transmitted in response to a user selection of said selected second communication apparatus from the list and requesting said selected second communication apparatus to provide humanly perceptible notification that said selected second communication apparatus has been selected, said first request including a media access control (MAC) address of the first communication apparatus, and
wherein said second request is transmitted in response to a registration operation input at said first communication apparatus and requesting said selected second communication apparatus to register said first communication apparatus, said second request including the MAC address of the first communication apparatus; and
each of said second communication apparatuses including
means for receiving said first and second requests sent from said first communication apparatus, means for providing humanly perceptible notification that said second communication apparatus has been selected in response to said first request, means for providing an instruction to register said first communication apparatus in response to a user operation at said second communication apparatus, after receipt of said second request, and means for registering said first communication apparatus in a delivery destination management table stored in said second communication apparatus by storing the MAC address of the first communication apparatus in the delivery destination management table, when the instruction to register said first communication apparatus is provided in response to the user operation and the MAC address in the first request matches the MAC address in the second request.

2. A communication apparatus to communicate over a network, comprising:

means for detecting other communication apparatuses connected to said network as detected other communication apparatuses using a query packet including a device kind identifier, a unique identifier ID and an IP address of the communication apparatus;

means for receiving query response packets from the other communication apparatuses, each of the query response packets including a device kind identifier, a unique identifier ID and an IP address of a corresponding one of the other communication apparatuses;

means for storing the device kind identifiers, the unique identifier IDs and the IP addresses included in each of the query response packets received from the other communication apparatuses in an identifier-to-kind correspondence table stored in the communication apparatus;

means for controlling display of a screen showing a list of said detected other communication apparatuses based on the query response packets received;

means for transmitting the query packet, a first request and a second request to a selected other communication apparatus of said detected other communication apparatuses based upon corresponding user selections, wherein said first request is transmitted in response to user selection of said selected other communication apparatus from the list and includes a request requesting said selected other communication apparatus to provide humanly perceptible notification that said selected other communication apparatus has been selected, said first request including a media access control (MAC) address of the communication apparatus, and wherein said second request is transmitted in response to a registration operation input at said communication apparatus and requests said selected other communication apparatus to register said communication apparatus, said second request including the MAC address of the communication apparatus;

means for receiving a first response and a second response from said selected other communication apparatus, said first response indicating that the humanly perceptible notification has been provided by said selected other communication apparatus and said second response indicating that said communication apparatus has been registered with said selected other communication apparatus; and means for registering said selected other communication apparatus in a delivery source management table stored in said communication apparatus by storing a media access control (MAC) address of the selected other communication apparatus in the delivery source management table, in response to the second response received from said selected other communication apparatus.

3. The communication apparatus according to claim 2, wherein, upon receipt of said first response, said means for controlling display of a screen further includes means for updating display of said screen to permit user selection of the registration operation.

4. The communication apparatus according to claim 2, wherein said first request includes a request requesting said selected other communication apparatus to blink a light emitting diode arrangement.

5. A communication method for causing a communication apparatus to communicate over a network, comprising:

detecting other communication apparatuses connected to said network as detected other communication apparatuses using a query packet including a device kind identifier, a unique identifier ID and an IP address of the communication apparatus;

receiving, over the network, query response packets from the other communication apparatuses, each query response packet including a device kind identifier, a unique identifier ID and an IP address of a corresponding one of the other communication apparatuses;

storing the device kind identifiers, the unique identifier IDs and the IP addresses included in each query response packets received from the other communication apparatuses in an identifier-to-kind correspondence table stored in the communication apparatus;

controlling display of a screen showing a list of said detected other communication apparatuses based on the query response packets received;

transmitting the query packet, a first request and a second request to a selected other communication apparatus of said detected other communication apparatuses based upon corresponding user selections, wherein said first request is transmitted in response to user selection of said selected other communication apparatus from the list and includes a request requesting said selected other communication apparatus to provide humanly perceptible notification that said selected other communication apparatus has been selected, said first request including a media access control (MAC) address of the communication apparatus, and wherein said second request is transmitted in response to a registration operation input at said communication apparatus and requests said selected other communication apparatus to register said communication apparatus, said second request including the MAC address of the communication apparatus;

receiving a first response and a second response from said selected other communication apparatus, said first response indicating that the humanly perceptible notification has been provided by said selected other communication apparatus and said second response indicating that said communication apparatus has been registered with said selected other communication apparatus; and registering said selected other communication apparatus in a delivery source management table stored in said communication apparatus by storing a media access control (MAC) address of the selected other communication apparatus in the delivery source management table, in response to the second response received from said selected other communication apparatus.

6. A non-transitory computer readable storage medium storing computer readable instructions thereon, that, when executed by a processor, cause the processor to execute a process enabling a communication apparatus to communicate over a network, comprising:
- detecting other communication apparatuses connected to said network as detected other communication apparatuses using a query packet including a device kind identifier, a unique identifier ID and an IP address of the communication apparatus;
- receiving, over the network, query response packets from the other communication apparatuses, each query response packet including a device kind identifier, a unique identifier ID and an IP address of a corresponding one of the other communication apparatuses;
- controlling display of a screen showing a list of said detected other communication apparatuses based on the query response packets received;
- transmitting the query packet, a first request and a second request to a selected other communication apparatus of said detected other communication apparatuses based upon corresponding user selections,
  - wherein said first request is transmitted in response to user selection of said selected other communication apparatus from the list and includes a request requesting said selected other communication apparatus to provide humanly perceptible notification that said selected other communication apparatus has been selected, said first request including a media access control (MAC) address of the communication apparatus, and
  - wherein said second request is transmitted in response to a registration operation input at said communication apparatus and requests said selected other communication apparatus to register said communication apparatus, said second request including the MAC address of the communication apparatus;
- receiving a first response and a second response from said selected other communication apparatus, said first response indicating that the humanly perceptible notification has been provided by said selected other communication apparatus and said second response indicating that said communication apparatus has been registered with said selected other communication apparatus; and
- registering said selected other communication apparatus in a delivery source management table stored in said communication apparatus by storing a media access control (MAC) address of the selected other communication apparatus in the delivery source management table, in response to the second response received from said selected other communication apparatus.

7. A communication apparatus to communicate over a network, comprising:
- means for receiving a query packet from another communication apparatus over the network, the query packet including a device kind identifier, a unique identifier ID and an IP address of the another communication apparatus;
- means for transmitting a query response packet to the another communication apparatus over the network, the query response packet including a device kind identifier, a unique identifier ID and an IP address of the communication apparatus;
- means for storing the device kind identifier, the unique identifier ID and the IP address included in the query packet received from the another communication apparatus in an identifier-to-kind correspondence table stored in the communication apparatus;
- means for receiving first and second requests sent from the another communication apparatus connected to said network, said first request including a media access control (MAC) address of said another communication apparatus and a notification request that requests said communication apparatus to indicate that said communication apparatus has been selected, and said second request including the MAC address of said another communication apparatus and a request that requests said communication apparatus to register said another communication apparatus based upon a user operation at said communication apparatus;
- means for providing humanly perceptible notification that said communication apparatus has been selected in response to said first request;
- means for providing an instruction to register said another communication apparatus in response to the user operation at said communication apparatus, after receipt of said second request; and
- means for registering said another communication apparatus in a delivery destination management table stored in said communication apparatus by storing the MAC address of the another communication apparatus in the delivery destination management table, when the instruction to register said another communication apparatus is provided in response to the user operation and the MAC address in the first request matches the MAC address in the second request.

8. The communication apparatus according to claim 7, further comprising:
- means for transmitting a first response to said another communication apparatus, said first response indicating that the humanly perceptible notification has been provided by said communication apparatus.

9. The communication apparatus according to claim 8, wherein
said means for transmitting a first response includes means for transmitting a second response to said another communication apparatus, when the registration of said another communication apparatus has completed by said means for registering, said second response including an indication that the registration of said another communication apparatus has been completed.

10. The communication apparatus according to claim 7, wherein
said means for providing humanly perceptible notification comprises a light emitting diode arrangement.

11. The communication apparatus according to claim 10, further comprising:
- means for controlling said light emitting diode arrangement to blink at a first blinking speed when said first request is received from said another communication apparatus and to blink at a second blinking speed when the instruction to register said another communication apparatus is provided in response to the user operation.

12. The communication apparatus according to claim claim 10, wherein
said means for registering includes means for comparing the information regarding the media access control (MAC) address included in said first request with the information regarding the media access control (MAC) address included in said second request, after receipt of said second request and when the instruction to register said another communication apparatus is provided in response to the user operation, and registers said another communication apparatus when a match exists, and the communication apparatus further comprises means for controlling said light emitting diode arrangement to blink at a first blinking speed when said first request is received from said another communication apparatus and to blink at a second blinking speed when the instruction to register said another communication apparatus is provided in response to the user operation.

13. A communication method of a communication apparatus to communicate over a network, comprising:
    receiving a query packet from another communication apparatus over the network, the query packet including a device kind identifier, a unique identifier ID and an IP address of the another communication apparatus;
    transmitting a query response packet to the another communication apparatus over the network, the query response packet including a device kind identifier, a unique identifier ID and an IP address of the communication apparatus;
    storing the device kind identifier, the unique identifier ID and the IP address included in the query packet received from the another communication apparatus in an identifier-to-kind correspondence table stored in the communication apparatus;
    receiving first and second requests sent from the another communication apparatus connected to said network, said first request including a media access control (MAC) address of said another communication apparatus and a notification request that requests said communication apparatus to indicate that said communication apparatus has been selected, and said second request including the MAC address of said another communication apparatus and a request that requests said communication apparatus to register said another communication apparatus based upon a user operation at said communication apparatus;
    providing humanly perceptible notification that said communication apparatus has been selected in response to said first request;
    providing an instruction to register said another communication apparatus in response to the user operation at said communication apparatus, after receipt of said second request; and
    registering said another communication apparatus in a delivery destination management table stored in said communication apparatus by storing the MAC of the another communication apparatus in the delivery destination management table, when the instruction to register said another communication apparatus is provided in response to the user operation and the MAC address in the first request matches the MAC address in the second request.

14. A non-transitory computer readable storage medium storing computer readable instructions thereon, that, when executed by an arithmetic processor, cause the processor to execute a process of a communication apparatus to communicate over a network, comprising:
    receiving a query packet from another communication apparatus over the network, the query packet including a device kind identifier, a unique identifier ID and an IP address of the another communication apparatus;
    transmitting a query response packet to the another communication apparatus over the network, the query response packet including a device kind identifier, a unique identifier ID and an IP address of the communication apparatus;
    storing the device kind identifier, the unique identifier ID and the IP address included in the query packet received from the another communication apparatus in an identifier-to-kind correspondence table stored in the communication apparatus;
    receiving first and second requests sent from the another communication apparatus connected to said network, said first request including a media access control (MAC) address of said another communication apparatus and a notification request that requests said communication apparatus to indicate that said communication apparatus has been selected, and said second request including the MAC address of said another communication apparatus and a request that requests said communication apparatus to register said another communication apparatus based upon a user operation at said communication apparatus;
    providing humanly perceptible notification that said communication apparatus has been selected in response to said first request;
    providing an instruction to register said another communication apparatus in response to the user operation at said communication apparatus, after receipt of said second request; and
    registering said another communication apparatus in a delivery destination management table stored in said communication apparatus by storing the MAC address of the another communication apparatus in the delivery destination management table, when the instruction to register said another communication apparatus is provided in response to the user operation and the MAC address in the first request matches the MAC address in the second request.

15. A communication apparatus to communicate over a network, comprising:
    a detection device configured to detect other communication apparatuses connected to said network as detected other communication apparatuses using a query packet including a device kind identifier, a unique identifier ID and an IP address of the communication apparatus;
    a display control device configured to control display of a screen showing a list of said detected other communication apparatuses based on query response packets received from the other communication apparatuses, each query response packet including a device kind identifier, a unique identifier ID and an IP address of a corresponding one of the other communication apparatuses;
    a storage device for storing the device kind identifiers, the unique identifier IDs and the IP addresses included in each of the query response packets received from the other communication apparatuses in an identifier-to-kind correspondence table stored in the communication apparatus;
    a transmission device configured to transmit the query packet, a first request and a second request to a selected other communication apparatus of said detected other communication apparatuses based on corresponding user selections,
        wherein said first request is transmitted in response to user selection of said selected other communication apparatus from the list and includes a request requesting said selected other communication apparatus to provide humanly perceptible notification that said selected other communication apparatus has been selected, said first request including a media access control (MAC) address of the communication apparatus, and wherein said second request is transmitted in response to a registration operation input at said communication apparatus and requests said selected other communication apparatus to register said communication apparatus, the second request including the MAC address of the communication apparatus;

a reception device configured to receive a first response and a second response from said selected other communication apparatus, said first response indicating that the humanly perceptible notification has been provided by said selected other communication apparatus and said second response indicating that said communication apparatus has been registered with said selected other communication apparatus; and a registration device configured to register said selected other communication apparatus in a delivery source management table stored in said communication apparatus by storing a media access control (MAC) address of the selected other communication apparatus in the delivery source management table, in response to the second response received from said selected other communication apparatus.

16. A communication apparatus to communicate over a network, comprising:

a reception device configured to receive a query packet, and first and second requests sent from another communication apparatus connected to said network, said query packet including a device kind identifier, a unique identifier ID and an IP address of said another communication apparatus, said first request including a media access control (MAC) address of said another communication apparatus and a notification request that requests said communication apparatus to indicate that said communication apparatus has been selected, and said second request including a media access control (MAC) address of the another communication apparatus and a request that requests said communication apparatus to register said another communication apparatus based upon a user operation at said communication apparatus;

a transmission device configured to transmit a query response packet to said another communication apparatus over the network, the query response packet including a device kind identifier, a unique identifier ID and an IP address of the communication apparatus;

a storage device configured to store the device kind identifier, the unique identifier ID and the IP address included in the query packet received from the another communication apparatus in an identifier-to-kind correspondence table stored in the communication apparatus;

a notification device configured to provide humanly perceptible notification that said communication apparatus has been selected in response to said first request;

an instruction device configured to provide an instruction to register said another communication apparatus in response to the user operation at said communication apparatus, after receipt of said second request; and a registration device configured to register said another communication apparatus in a delivery destination management table stored in said communication apparatus by storing the MAC address of the another communication apparatus in the delivery destination management table, when the instruction to register said another communication apparatus is provided in response to the user operation and the MAC address in the first request matches the MAC address in the second request.

* * * * *